(12) United States Patent
Gasper et al.

(10) Patent No.: US 8,664,995 B2
(45) Date of Patent: Mar. 4, 2014

(54) UNIFORM-FOOTPRINT PROGRAMMABLE-SKEW MULTI-STAGE DELAY CELL

(71) Applicant: LSI Corporation, San Jose, CA (US)

(72) Inventors: Martin J. Gasper, Southport, NC (US); Michael J. McManus, Liberty Township, OH (US)

(73) Assignee: LSI Corporation, San Jose, CA (US)

( * ) Notice: Subject to any disclaimer, the term of this patent is extended or adjusted under 35 U.S.C. 154(b) by 0 days.

(21) Appl. No.: 13/962,191

(22) Filed: Aug. 8, 2013

(65) Prior Publication Data

US 2013/0321054 A1  Dec. 5, 2013

Related U.S. Application Data

(63) Continuation of application No. 13/428,155, filed on Mar. 23, 2012, now Pat. No. 8,536,921.

(51) Int. Cl.
*H03H 11/06* (2006.01)
(52) U.S. Cl.
USPC ........... 327/261; 327/170; 327/264; 327/278; 327/285; 327/564
(58) Field of Classification Search
USPC ......... 327/170, 178, 261, 263–264, 276–278, 327/284–285, 564–566
See application file for complete search history.

(56) References Cited

U.S. PATENT DOCUMENTS

| | | | |
|---|---|---|---|
| 5,227,679 A | 7/1993 | Woo | |
| 5,821,783 A * | 10/1998 | Torimaru et al. | 327/108 |
| 6,356,132 B1 | 3/2002 | Mastrocola et al. | |
| 7,199,618 B2 | 4/2007 | Gliese et al. | |
| 7,230,457 B2 | 6/2007 | Waldrop | |
| 7,525,356 B2 | 4/2009 | Hui et al. | |
| 7,933,160 B2 * | 4/2011 | Kim | 365/207 |
| 2003/0048122 A1 | 3/2003 | Kazi | |

* cited by examiner

*Primary Examiner* — An Luu

(57) ABSTRACT

Described embodiments provide a delay cell for a complementary metal oxide semiconductor integrated circuit. The delay cell includes a delay stage to provide an output signal having a programmable delay through the delay cell. The delay cell has a selectable delay value from a plurality of delay values and a selectable output skew value from a plurality of output skew values, where the cell size and terminal layout of the delay cell are relatively uniform for the plurality of delay values and the plurality of output skew values. The delay stage includes M parallel-coupled inverter stages of stacked PMOS transistors and stacked NMOS transistors. The stacked transistors have configurable source-drain connections between a drain and a source of each transistor, wherein the selectable delay value corresponds to a configuration of the configurable source-drain connections to adjust a delay value of each of the M inverter stages and an output skew value of the delay cell.

19 Claims, 20 Drawing Sheets

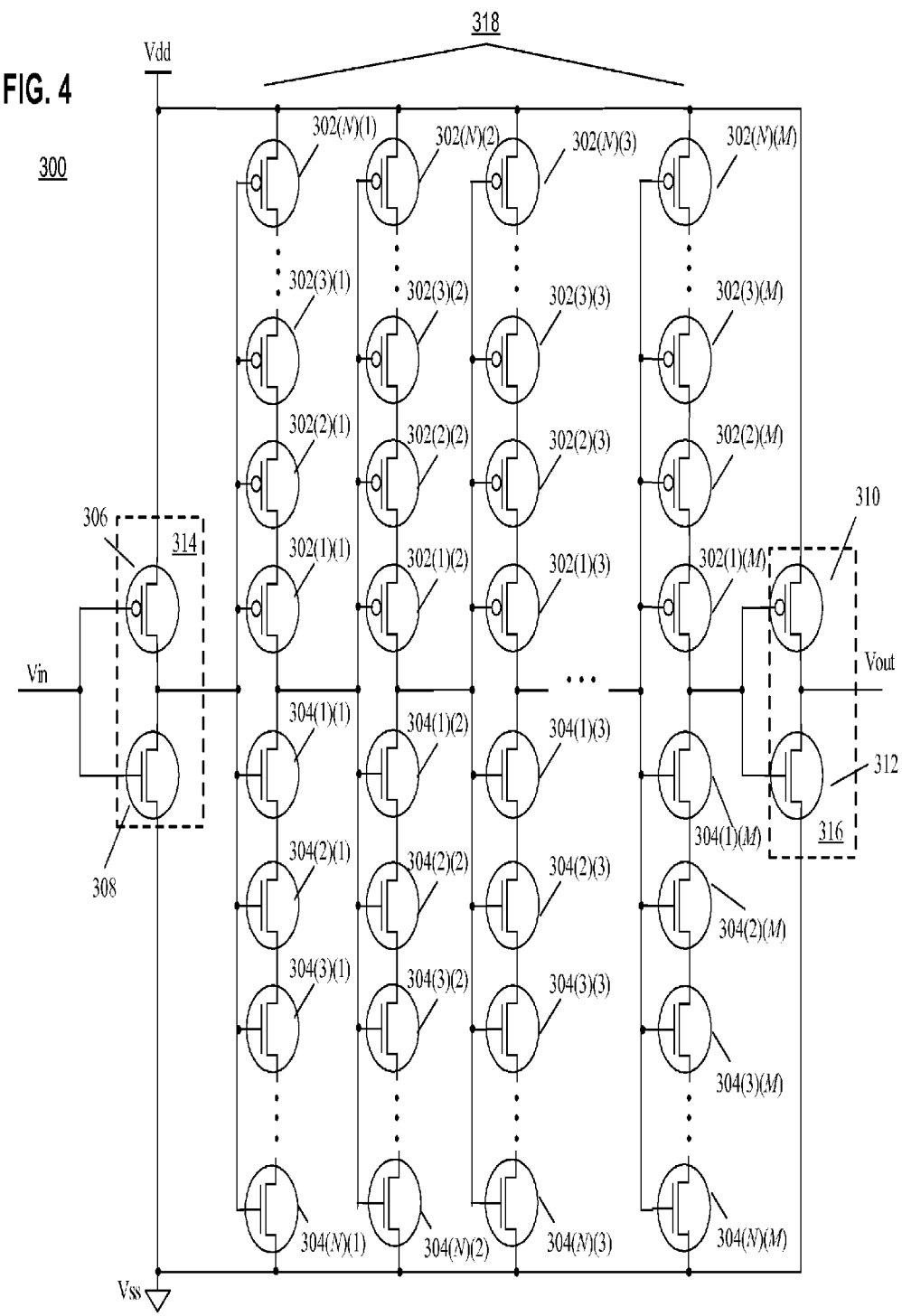

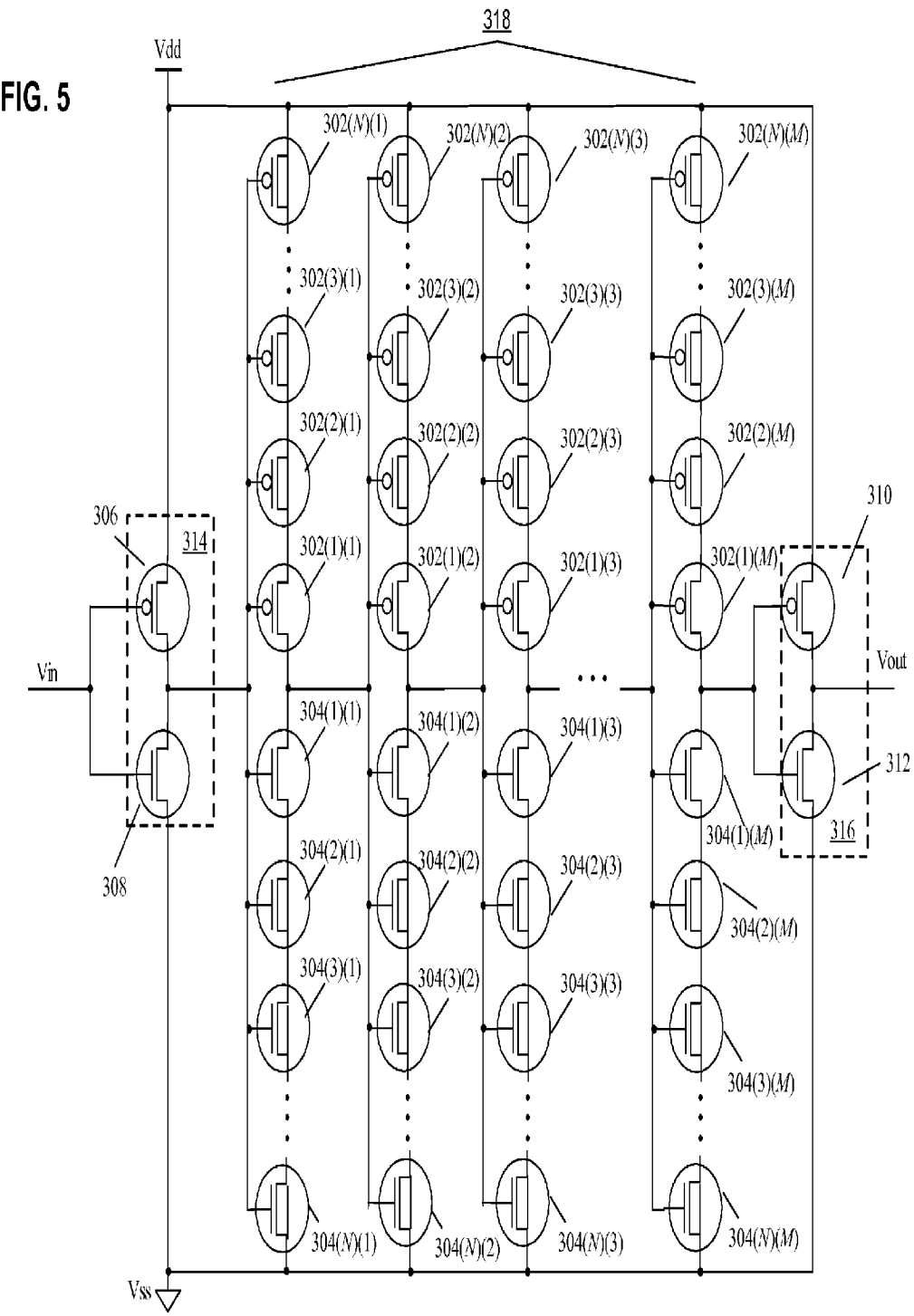

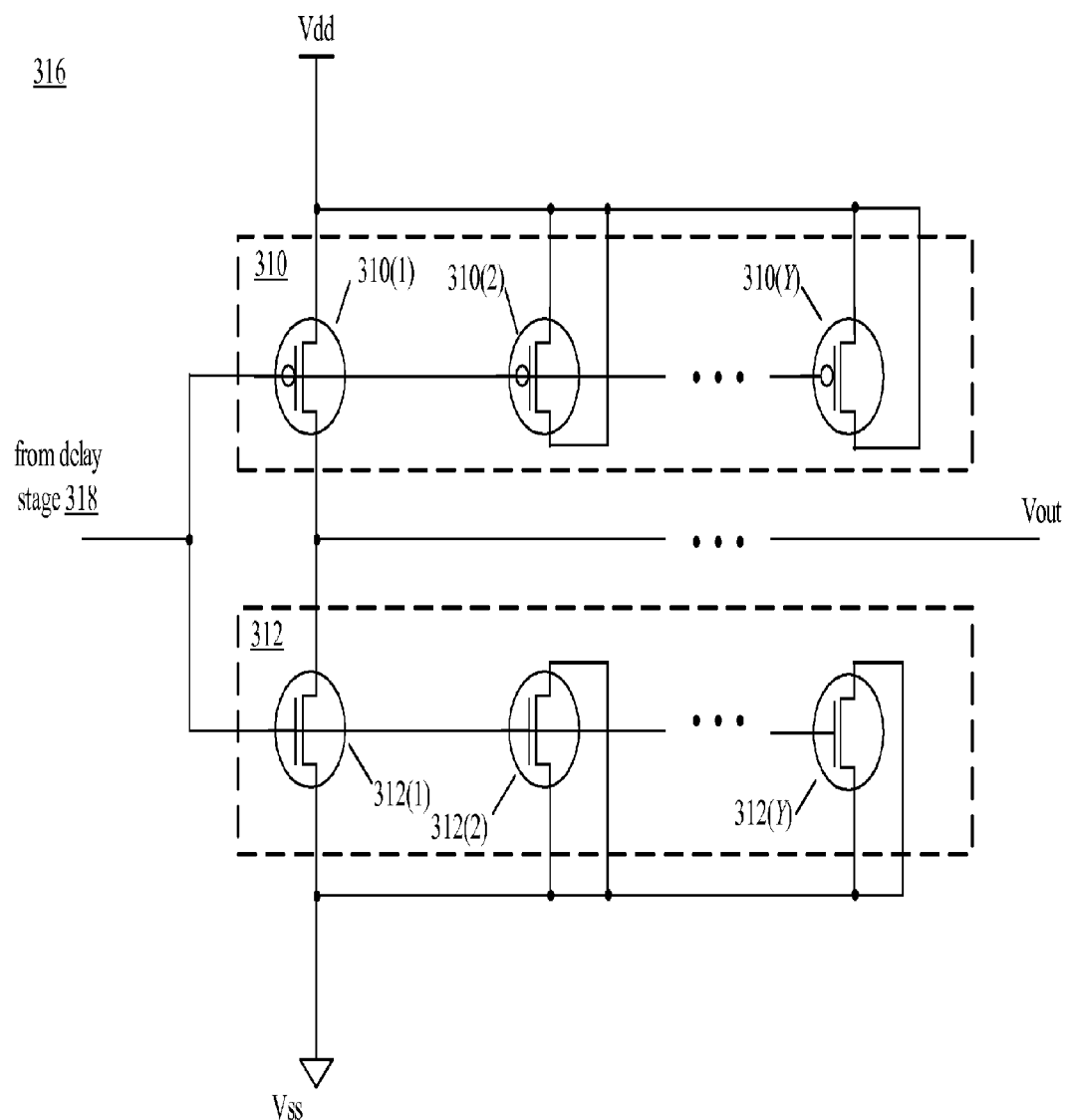

FIG. 16
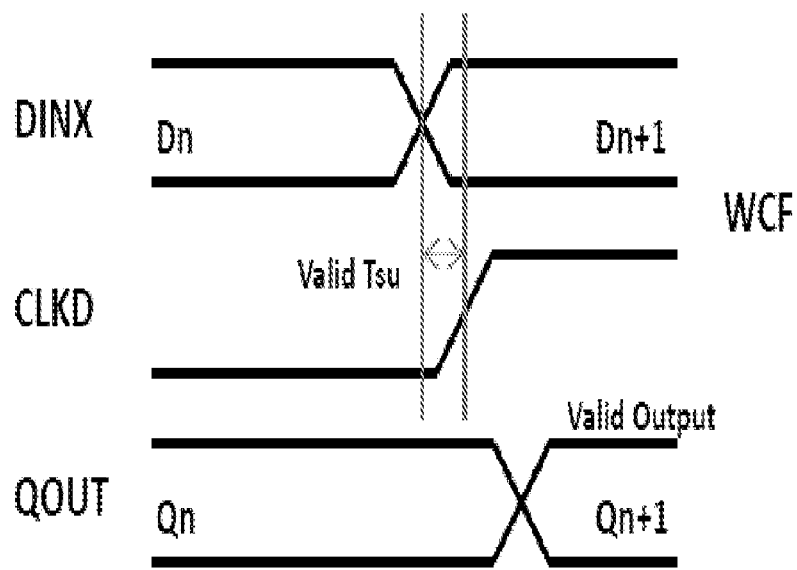
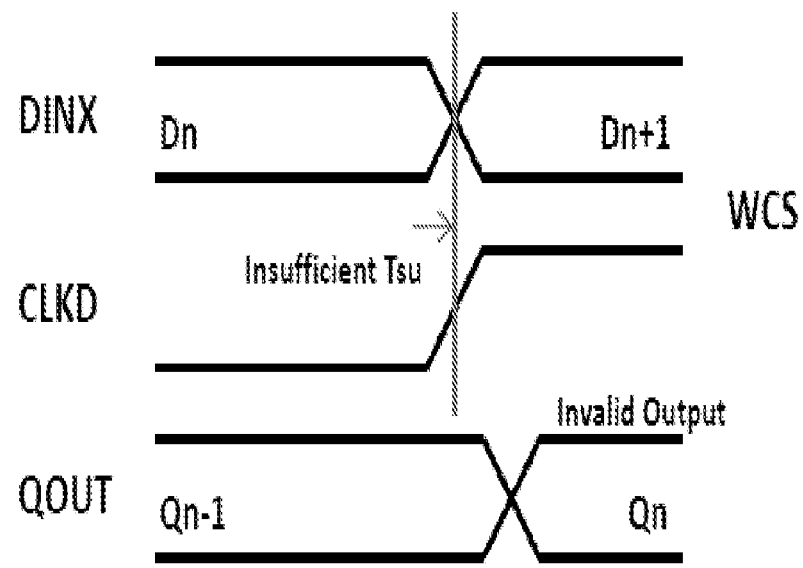

1700

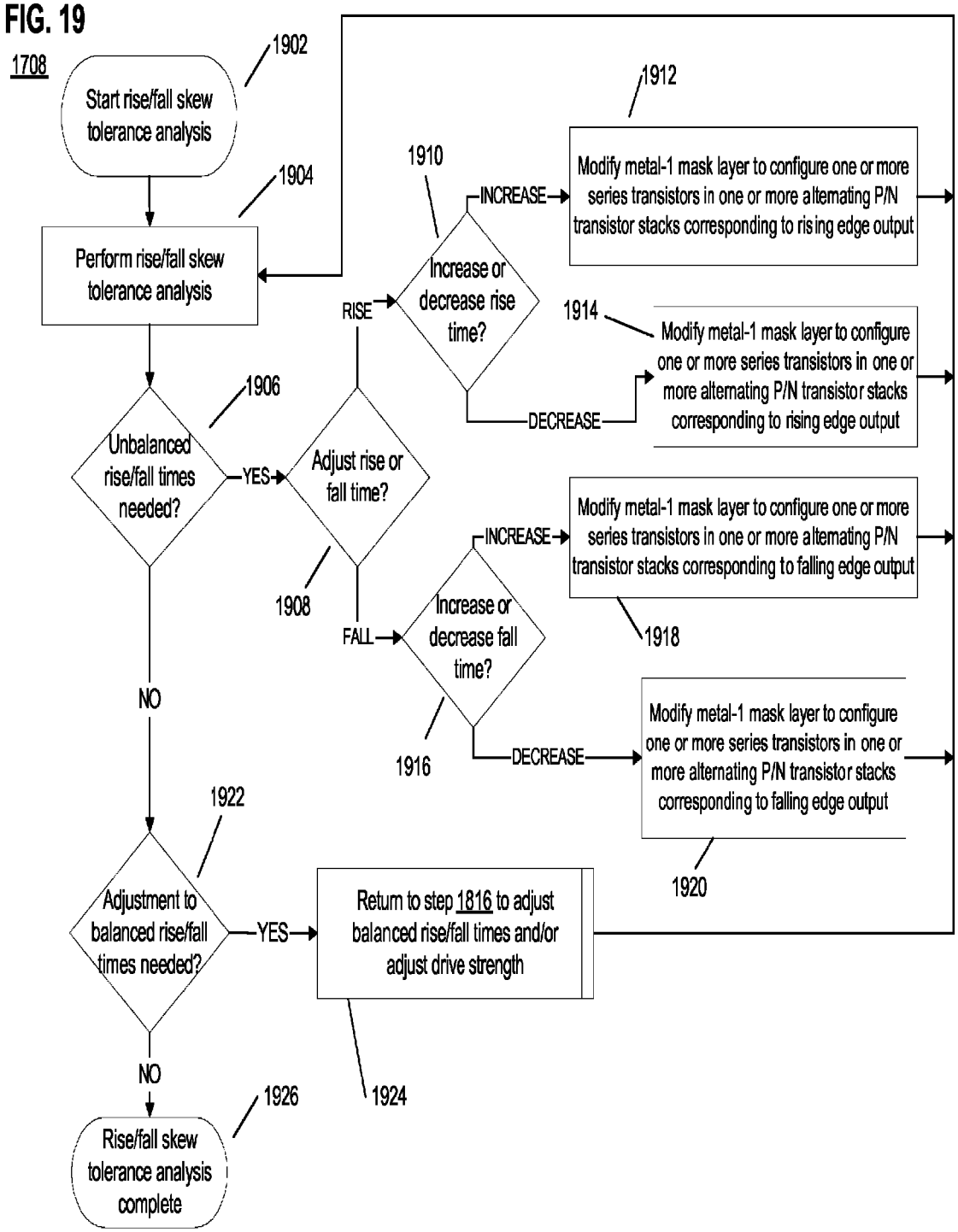

US 8,664,995 B2

UNIFORM-FOOTPRINT PROGRAMMABLE-SKEW MULTI-STAGE DELAY CELL

CROSS-REFERENCE TO RELATED APPLICATIONS

This application is a continuation, and claims the benefit of the filing date, of U.S. patent application Ser. No. 13/428,155 filed Mar. 23, 2012, which is a continuation-in-part, and claims the benefit of the filing date, of U.S. patent application Ser. No. 13/210,664 filed Aug. 16, 2011 now issued as U.S. Pat. No. 8,461,893, the teachings of all of which are incorporated herein in their entireties by reference.

BACKGROUND

Complementary metal oxide semiconductor (CMOS) integrated circuits (ICs) typically include one or more clock networks for providing one or more clock signals to various circuit elements of the IC. The clock networks include one or more clock sources coupled to one or more clock "sinks"—circuit elements that require a clock signal. Typical clock sinks might include flip-flops, latches, registers, gates and other circuit elements. In general, clock signals are regularly timed periodic signals, which might be utilized for timing purposes, for example, to synchronize, switch or trigger one or more circuit elements of the IC. A typical clock signal might be generated by a crystal-based clock, a phase-locked loop (PLL) clock, a ring oscillator or other similar circuits either internal to or external to the IC.

The timing of clock and data signals in ICs is typically precisely controlled, and clock signals routed within the IC are desirably synchronized such that each clock sink receives the same clock signal at approximately the same time. A common problem in IC design is "clock skew". Clock skew occurs if clock signals arrive at the various clock sinks at different times, impairing synchronized operation of circuit elements of the IC. Thus, the delay faced by a given data or clock signal over its respective signal path, from the signal source to the signal sink, is accounted for in the design and implementation of an IC. For example, the path length, resistance, parasitic capacitance, parasitic inductance, the number and type of attached clock sinks, and other characteristics of a given signal path might affect the delay between a given signal source and a given signal sink.

Therefore, an IC designer attempts to ensure that the various clock signal paths of a given clock network have substantially the same signal delay. Fine tuning of circuit path timing in the IC design (termed "timing closure") involves completing complex circuit placement and routing routines along with tuning data path and clock signal delays. To reduce circuit design area and power, as well as manage clock skew, delay cells might be placed within clock signal paths, as opposed to modifying the numerous data and clock signal paths of the IC, which is a time consuming and expensive part of the design process. Introduction of delay cells allows for optimization of clock networks by tuning with inserted delays to correct timing issues, with fewer cell changes to the IC design.

FIG. 1 shows a circuit diagram of a typical prior art delay cell 100. As shown in FIG. 1, a typical delay cell comprises a string of cascaded CMOS inverters, shown as 102(1)-102(N), where N is typically a positive even integer. Each CMOS inverter is typically implemented in a similar manner. For example, CMOS inverter 102(1) comprises PMOS transistor 104(1) and NMOS transistor 106(1) coupled in a cascade configuration, where the gate nodes of both transistors 104(1) and 106(1) are coupled to an input signal, shown as Vin. The source node of PMOS transistor 104(1) is coupled to a first power supply signal, shown as Vdd, and the source node of NMOS transistor 106(1) is coupled to a second power supply signal, shown as Vss, where Vdd is at a greater voltage potential than Vss (i.e. Vss is less than Vdd). The drain node of PMOS transistor 104(1) is coupled to the drain node of NMOS transistor 106(1), providing an output signal, Vout(1). Output signal Vout(1) might be provided to a next CMOS inverter 102 (e.g., CMOS inverter 102(2), not explicitly shown in FIG. 1), or might be provided as the output of delay cell 100 (e.g., Vout(N)).

In general, each CMOS inverter 102(1)-102(N) might be implemented such that each of transistors 104 and 106 has a non-minimum channel length so as to create relatively slower inverters, thus creating delay elements, where the channel length of a transistor is the distance between the source node and the drain node. A shorter channel length corresponds to faster switching by the transistor. To increase or decrease the delay, additional inverters might be added or subtracted from delay cell 100 (e.g., N might be increased or decreased), or the channel length of each of transistors 104 and 106 might be increased or decreased to achieve a target delay time for delay cell 100. Inverter 102(1)-102(N) might typically employ transistors having a long channel length (e.g., 5 times the minimum channel length of the CMOS technology). Delay cell 100 might typically be implemented having values of N (e.g., the number of inverter stages) from 2 to 10 or more. Further, delay cell 100 might be modified to have different output inverter drive strengths to accommodate signal loading variations in different applications. Increasing or decreasing the number of inverters 102 in delay cell 100, changing the channel length of the transistors 104 and 106, and changing the drive strength for output inverter 102(N) all impact the overall physical size of delay cell 100 on the silicon of an IC. Thus, each time delay value might be implemented with a corresponding delay cell of a unique physical size. Circuit element sizes are commonly measured as grids in standard cell library terms, where a grid is typically the unit size of the overlying routing grid of the IC.

Delay cells typically found in standard cell libraries each have a unique cell size depending on the delay value, since the delay value is based on the number of delay elements, the size of the delay elements, and the drive strength of the output inverter of the delay cell. The drive strength might need to be increased or decreased, for example, based on a number of clock sinks coupled to the output of the delay cell. During timing closure, if a timing change is needed for more or less delay, regardless of the timing delta, the IC designer is required to select a different delay cell from the standard cell library. The switch to a different delay cell might create significant disruption to the current place and route results depending on the size difference between delay cells. Subsequently generated place and route results might then produce signal parasitic differences, introducing further difficulties in the timing closure process.

FIGS. 2a and 2b show an exemplary IC design layout of the prior art. As shown in FIG. 2a, an IC design might comprise one or more cell rows, shown as cell rows 202 and 206, where the cell rows are interconnected by cell interconnect grid 204. Each cell row might allow an IC designer to place one or more circuit elements from the cell library, shown generally as cells 210. Routing of signals between cells can be set by cell interconnect grid 204. As shown in FIG. 2a, the IC designer has first placed a delay cell 1, which occupies cell area 208, and which has a given delay value. If, in the course of timing closure, the IC designer determines that a different delay value is required to meet timing requirements of the IC, the designer must select a different delay cell from the cell library that has the desired delay value. As shown in FIG. 2b, delay cell 2, having a larger delay value than delay cell 1, is placed into the IC design. Delay cell 2 occupies cell area 208 taken up by delay cell 1, plus additional cell area 222. By occupying a larger cell area, employing delay cell 2 rather than delay cell 1 might also require changes to the locations of one or more surrounding cells 210 and also to signal routing in cell interconnect grid 204, indicated as shaded area 224.

Further, as CMOS technology continues to reduce geometry to provide smaller and faster devices, relatively large delays (e.g., hundreds of ps or 1 ns) become difficult to obtain without a very large delay cell area. Typical delay cell elements for large delays employ a series of CMOS inverters where the internal inverters use very long channel length transistors—often three to ten times the minimum channel length for the given CMOS technology. These very long channel transistors create difficulties in trying to maintain balanced rise/fall delay skew across the operating range of manufacturing process, voltage and temperature (PVT) worst-case slow (WCS) and worst-case fast (WCF) variations of the IC. Additionally, in typical delay cells having balanced rise/fall delay skew, managing rise and fall signal skew for both data and clock signal paths creates difficulty in achieving timing closure. For example, if having unbalanced rise/fall delays is not possible, and circuit redesign might be necessary.

Another problem with long-channel transistors occurs during manufacturing testing of initial integrated circuit silicon. To emulate the WCS to WCF variation in silicon using one manufacturing lot, Polysilicon Gate (poly-gate) Critical Dimension (CD) variation is often performed. Poly-gates that are slightly widened or narrowed alter a transistor's switching performance and, therefore, circuit path delays. For example, a +/−5% poly-gate CD variation used for 40 nm CMOS technology corresponds to a poly-gate variation of +/−2 nm. However, a delay cell employing long-channel transistors (e.g., 120 nm), when varied by the same amount as other standard cell gates in the design (e.g., 2 nm), exhibits relatively negligible delay variation. With circuit timing closure achieved using accurately modeled WCS and WCF timing simulation libraries, silicon produced with poly-gate CD variation might have inaccurate skew of delay cell paths versus normal standard cell paths, resulting in timing problems and, in the worst-case, circuit failure.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Described embodiments provide a delay cell for a complementary metal oxide semiconductor integrated circuit. The delay cell includes a delay stage to provide an output signal having a programmable delay through the delay cell. The delay cell has a selectable delay value from a plurality of delay values and a selectable output skew value from a plurality of output skew values, where the cell size and terminal layout of the delay cell are relatively uniform for the plurality of delay values and the plurality of output skew values. The delay stage includes M parallel-coupled inverter stages of stacked PMOS transistors and stacked NMOS transistors. The stacked transistors have configurable source-drain connections between a drain and a source of each transistor, wherein the selectable delay value corresponds to a configuration of the configurable source-drain connections to adjust a delay value of each of the M inverter stages and an output skew value of the delay cell.

BRIEF DESCRIPTION OF THE DRAWING FIGURES

Other aspects, features, and advantages of the present invention will become more fully apparent from the following detailed description, the appended claims, and the accompanying drawings in which like reference numerals identify similar or identical elements.

FIG. 4 shows a schematic diagram of the delay cell of FIG. 3, implemented for a maximum delay value in accordance with exemplary embodiments;

FIG. 5 shows a schematic diagram of the delay cell of FIG. 3, implemented for a minimum delay value in accordance with exemplary embodiments;

FIG. 6b shows a schematic diagram of an output stage of the delay cell of FIG. 3, implemented for a minimum drive strength value in accordance with exemplary embodiments;

FIG. 16 shows an exemplary timing diagram of the logic circuit of FIG. 14 during a timing closure analysis;

FIG. 19 shows an exemplary flow diagram for modifying the rise and fall skew of the delay cell of FIG. 3, in accordance with exemplary embodiments.

DETAILED DESCRIPTION

Described embodiments provide a delay cell for a complementary metal oxide semiconductor integrated circuit. The delay cell includes a delay stage to provide an output signal having a programmable delay through the delay cell. The delay cell has a selectable delay value from a plurality of delay values and a selectable output skew value from a plurality of output skew values, where the cell size and terminal layout of the delay cell are relatively uniform for the plurality of delay values and the plurality of output skew values. The delay stage includes M parallel-coupled inverter stages of stacked PMOS transistors and stacked NMOS transistors. The stacked transistors have configurable source-drain connections between a drain and a source of each transistor, wherein the selectable delay value corresponds to a configuration of the configurable source-drain connections to adjust a delay value of each of the M inverter stages and an output skew value of the delay cell.

Table 1 summarizes a list of acronyms employed throughout this specification as an aid to understanding the described embodiments:

TABLE 1

| CMOS | Complementary metal oxide semiconductor | IC | Integrated Circuit |
|---|---|---|---|
| NMOS | N-channel MOS | PMOS | P-channel MOS |
| PVT | Process, Voltage, Temperature | PLL | Phase-Locked Loop |
| Poly-gate | Polysilicon gate | CD | Critical Dimension |
| Vdd | Positive supply voltage | Vss | Negative supply voltage/ground |
| WCS | Worst-case Slow | WCF | Worst-case Fast |
| Tsu | Setup Time | Tc | Clock Delay Time |
| Td | Delay Time | | |

Figure 1:
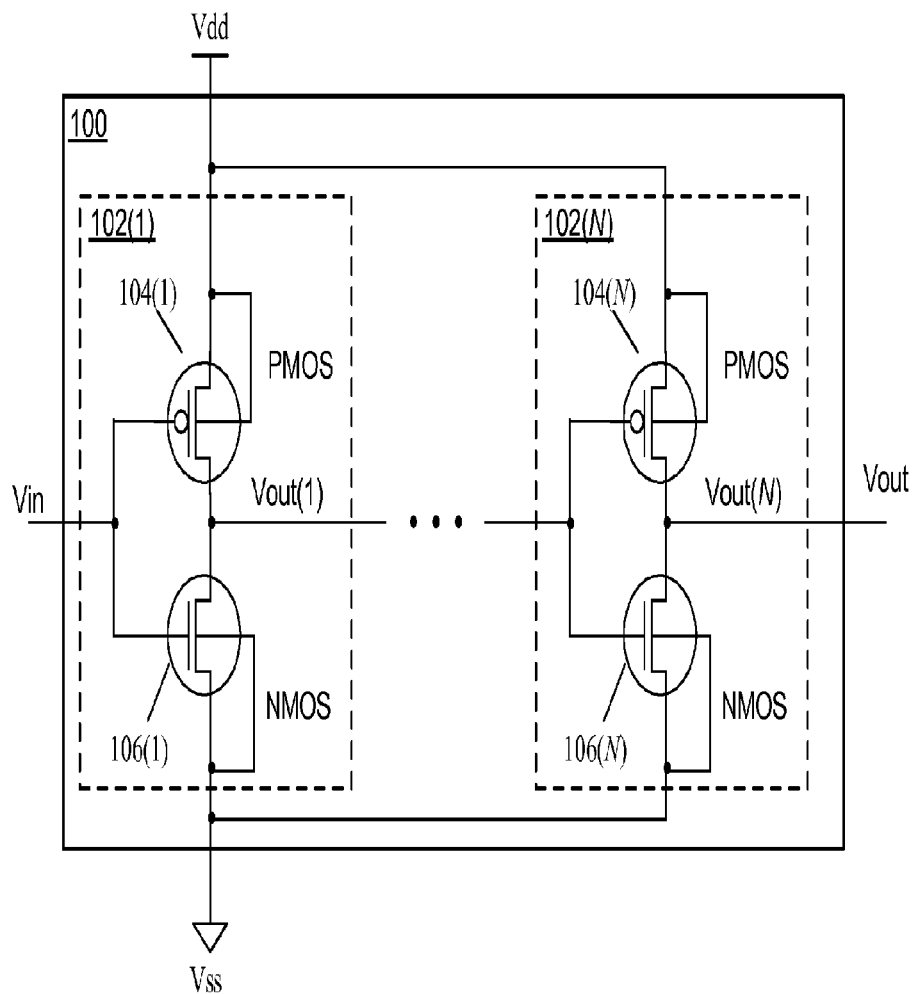
FIG. 1 shows a circuit diagram of a delay cell of the prior art.
Figure 2A:
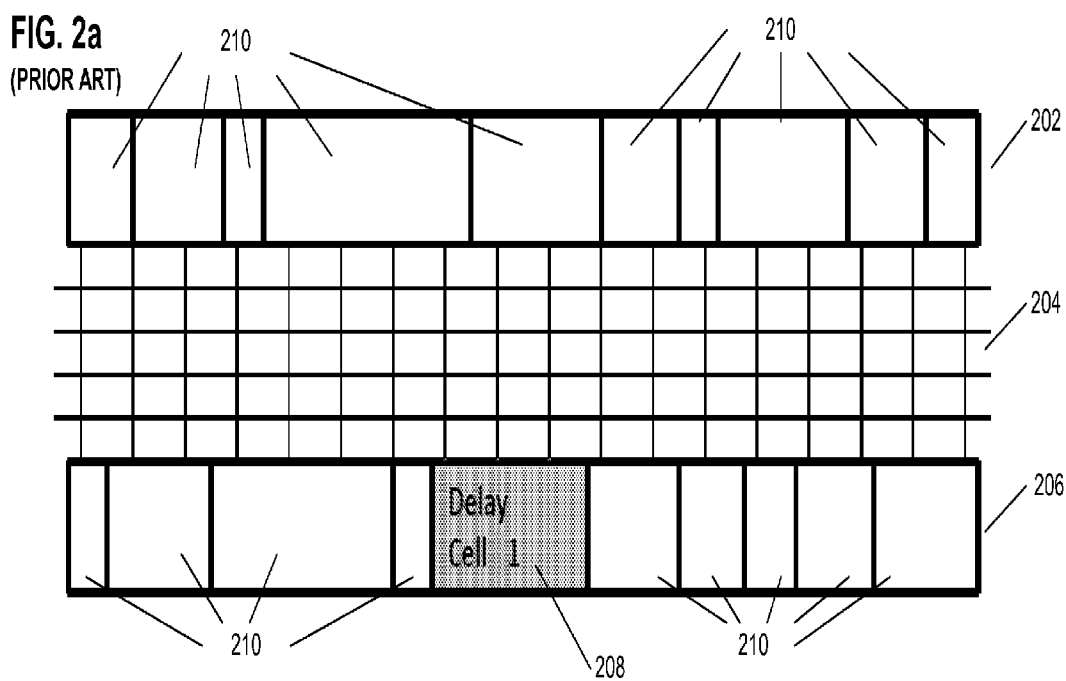
FIG. 2a and FIG. 2b show block diagrams of exemplary IC layouts employing delay cells of the prior art.
Figure 2B:
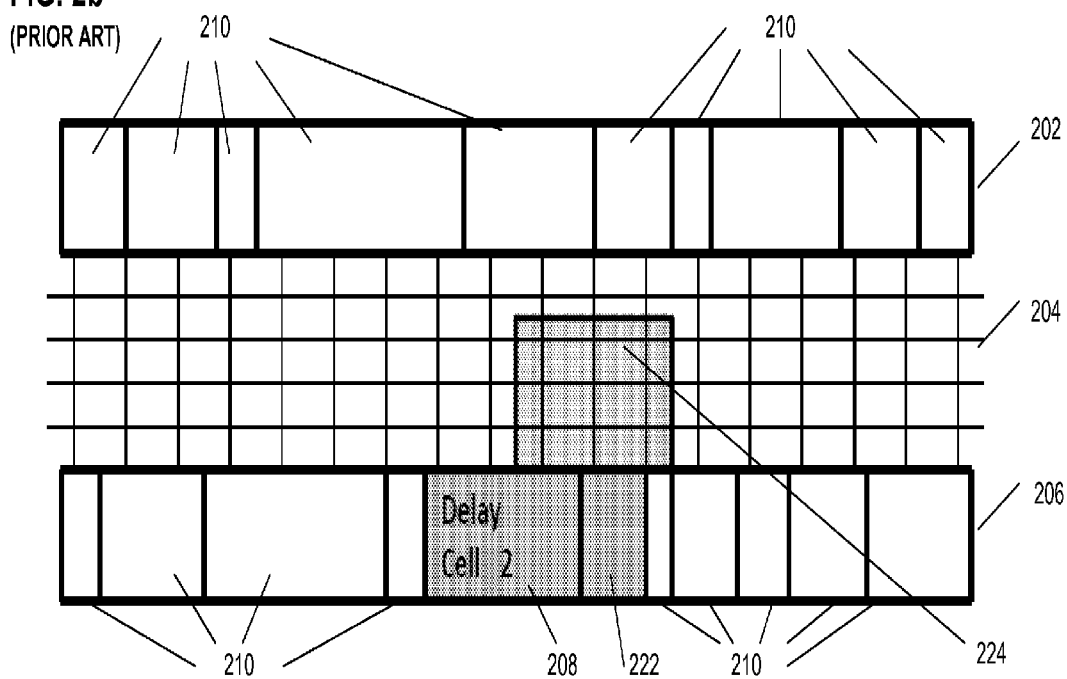
Figure 3:
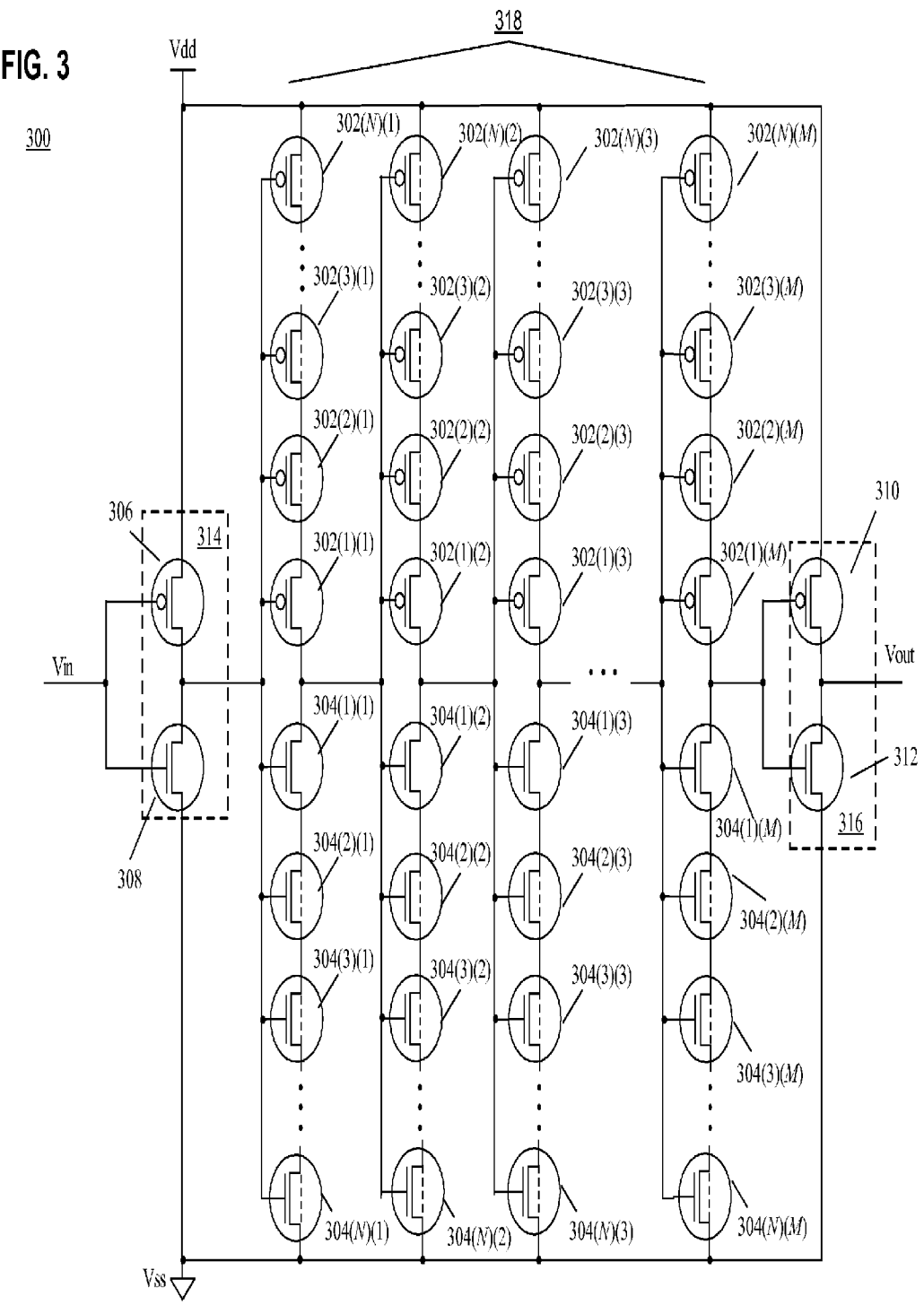
FIG. 3 shows schematic diagram of a delay cell in accordance with exemplary embodiments.

FIG. 3 shows a block diagram of programmable delay cell 300 in accordance with exemplary embodiments. As shown in FIG. 3, programmable delay cell 300 might comprise input inverter 314, output inverter 316 and a delay stage, shown generally as 318. Input inverter 314 might receive input signal Vin and comprise PMOS transistor 306 and NMOS transistor 308, where input signal Vin is provided to the gate nodes of PMOS transistor 306 and NMOS transistor 308. The source node of PMOS transistor 306 is coupled to the Vdd power supply rail, the source node of NMOS transistor 308 is coupled to the Vss power supply rail, and the drain node of PMOS transistor 306 is coupled to the drain node of NMOS transistor 308, and thereby, provides an output signal to delay stage 318. Output inverter 316 might employ PMOS transistor 310 and NMOS transistor 312 and provide output signal Vout, where an input signal from delay stage 318 is provided to the gate nodes of PMOS transistor 310 and NMOS transistor 312. The source node of PMOS transistor 310 is coupled to the Vdd power supply rail, the source node of NMOS transistor 312 is coupled to the Vss power supply rail, and the drain node of PMOS transistor 310 is coupled the drain node of NMOS transistor 312, and thereby, provides output signal Vout.

Delay stage 318 might employ multiple inverters comprising stacked PMOS and NMOS transistors, shown as PMOS transistors 302 and NMOS transistors 304. As shown in FIG. 3, each stack of PMOS transistors 302 and NMOS transistors 304 might employ up to N transistors, where N is a positive integer. In some embodiments, N might desirably be equal to 4, such that each inverter has a stack of 4 PMOS transistors 302 and 4 NMOS transistors 304. In some embodiments, M might desirably be equal to 4, such that delay stage 318 has 4 inverter stages, shown as 318(1)-318(M). As shown, each delay stage 318(1)-318(M) includes PMOS transistors 302(1)-302(N) and NMOS transistors 304(1)-304(N). Thus, in some embodiments, delay stage 318 might be a matrix of 4 inverter stages 318(1)-318(4), each inverter stage having 4 PMOS transistors 302 and 4 NMOS transistors 304. Delay cell 300 might be implemented in a standard IC design cell library such that it is always N by M, and thus is always the same physical size, regardless of the delay value for each occurrence of delay cell 300 throughout a given IC design.

As shown, the first PMOS transistor in each inverter stage (e.g., PMOS transistors 302(1)(1)-302(1)(M)) has its drain node coupled to the drain node of the first NMOS transistor in each inverter stage (e.g., NMOS transistors 304(1)(1)-304(1)(M)), providing an output signal to the gate nodes of the transistors of the next inverter stage. The last PMOS transistor in each inverter stage (e.g., PMOS transistors 302(N)(1)-302(N)(M)) has its source node connected to the Vdd power supply rail. Intermediate PMOS transistors (e.g., PMOS transistors 302(2)(1), 302(3)(1), etc.) are coupled in a stack (e.g., drain node to source node) between the first PMOS transistor (e.g., PMOS transistor 302(1)(1)) and the last PMOS transistor (e.g., PMOS transistor 302(N)(1)) of each stage. Similarly, the last NMOS transistor in each inverter stage (e.g., NMOS transistors 304(N)(1)-304(N)(M)) has its source node connected to the Vss power supply rail. Intermediate NMOS transistors (e.g., NMOS transistors 304(2)(1), 304(3)(1), etc.) are coupled in a stack (e.g., drain node to source node) between the first NMOS transistor (e.g., NMOS transistor 304(1)(1)) and the last NMOS transistor (e.g., NMOS transistor 304(N)(1)) of each inverter stage.

As shown in FIG. 3, other than the first PMOS transistor (e.g., PMOS transistors 302(1)(1)-302(1)(M)), each PMOS transistor of each inverter stage (e.g., PMOS transistors 302(2)(1)-302(N)(1), etc.) has a configurable connection between its source and drain regions, as indicated by the dashed lines. These configurable connections are employed to achieve a programmable delay value for delay cell 300. In some embodiments, an IC designer might program the delay value of delay cell 300 by modifying the configurable connections, for example, by modifying only the metal-1 interconnect layout of the delay cell in an IC design layout. The programmable delay value of delay cell 300 is determined by making the series transistor connections 1, 2, 3, or N transistors deep by selectively modifying the metal-1 interconnect layout to either short or open given ones of the configurable connections. Since, in a given IC design, every occurrence of delay cell 300 has the same values of N and M, and thus the same physical size, every occurrence of delay cell 300 in the IC design is identical in physical size and terminal locations (e.g., metal-2 signal pin connections), regardless of its delay value.

In some embodiments, M might be an even number to implement a non-inverting programmable delay cell. In other embodiments, M might be an odd number to implement an inverting programmable delay cell. Thus, an IC design library might be configured to include both inverting and non-inverting embodiments of programmable delay cell 300.

For example, as shown in FIG. 4, delay cell 300 is configured to achieve a maximum delay value. As described herein, the maximum delay for each inverter stage is attained by employing the most transistors in each inverter stage. Thus, the configurable connections for each of transistors 302(2)(i)-302(N)(i) and 304(2)(i)-304(N)(i) (where i is an index from 1 to M) are removed on the metal-1 layout of the delay cell. For example, in some embodiments where N and M equal 4, the maximum delay value of delay cell 300 is attained by having all 4 PMOS transistors 302 and all 4 NMOS transistors 304 in series, where the configurable connections are removed from the metal-1 layout, thus creating the slowest inverter stages of delay cell 300.

As shown in FIG. 5, delay cell 300 is configured to achieve a minimum delay value. As described herein, the minimum delay for each inverter stage is attained by employing the fewest transistors in each inverter stage. Thus, the configurable connections for each of transistors 302(2)(i)-302(N)(i) and 304(2)(i)-304(N)(i) are placed in the metal-1 layout of the delay cell to short out each of transistors 302(2)-302(N) and 304(2)-304(N). Thus, the minimum delay value of delay cell 300 is attained by having only one PMOS transistor 302 and only one NMOS transistor 304 in each inverter stage, where the configurable connections are placed in the metal-1 layout, thus creating the fastest inverter stages of delay cell 300.

Thus, as described herein, delay cell 300 can be programmed to have varying delay values based on the needs of an IC designer by varying the metal-1 layout of the delay cell, but without changing the physical size or terminal locations of the delay cell found in the cell library. Thus, during timing closure, if it is determined that a timing change is needed for more or less delay, the IC designer does not need to select a different delay cell from the standard cell library, but rather edits the metal-1 layout of the delay cell to add or remove configurable connections of the transistors. Thus, the current place and route results are not disturbed because there is no size difference between delay cells of different delay values.

In accordance with embodiments of the present invention, during design, when the IC designer changes a delay cell value, the various changes to the internal metal-1 layer of programmable delay cell 300 (e.g., the metal-1 changes described in regard to FIGS. 3-5) are "invisible" to the designer, who just places a programmable delay cell 300 from a library having a metal-1 layout corresponding to the desired delay value. Thus, if after the IC silicon has been manufactured an unforeseen timing issue occurs, a change in the delay value of programmable delay cell 300 might be adjusted such that the timing issue is corrected and only a metal-1 layer revision is required to fix timing instead of a total silicon design revision. In a typical 28 nm library, programmable delay cell 300 might have typical values expressed in a given number of inverter delays. For example, the typical 28 nm design library might include programmable delay cells having one or more of the following exemplary values: DEL0, 3.0 INV delays; DEL1, 3.4 INV delays; DEL2, 5.4 INV delays; DEL3, 7.3 INV delays; and DEL4, 9.4 INV delays.

Further, each transistor of delay cell 300 might be implemented having a channel length equal to the minimum channel length of the CMOS technology of the IC design. Thus, all of transistors 302(1)(1)-302(N)(M), 304(1)(1)-304(N)(M), 306, 308, 310 and 312 might have a channel length equal to the minimum channel length of the CMOS technology of the IC design. For example, in an IC design employing 40 nm CMOS technology, each of transistors 302(1)(1)-302(N)(M), 304(1)(1)-304(N)(M), 306, 308, 310 and 312 might have a channel length equal to 40 nm, rather than needing a longer channel length to attain the desired delay value (e.g., 120 nm channel length).

Figure 6A:
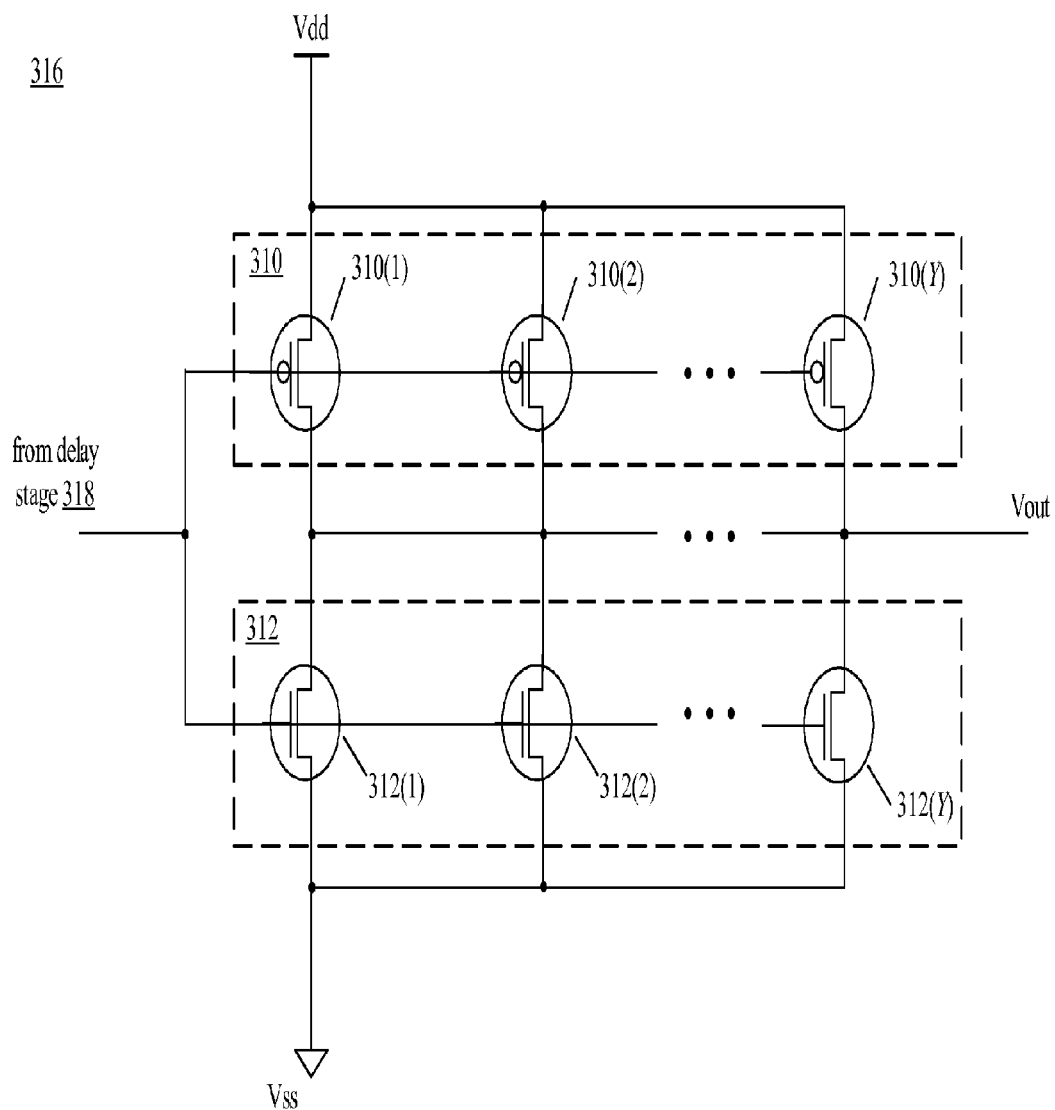
FIG. 6a shows a schematic diagram of an output stage of the delay cell of FIG. 3, implemented for a maximum drive strength value in accordance with exemplary embodiments.

Embodiments of the present invention also provide for programmable drive strength of delay cell 300. As shown in FIG. 6a, each of transistors 310 and 312 of output stage 316 might be implemented as one or more transistors in parallel, to allow for higher output currents provided as output signal Vout. For example, PMOS transistor 310 might be implemented as PMOS transistors 310(1)-310(Y), where Y is a positive integer. Similarly, NMOS transistor 312 might be implemented as NMOS transistors 312(1)-312(Y). The drive strength capability of delay cell 300 is set by the number of transistors 310(1)-310(Y) and 312(1)-312(Y) that are employed in output stage 316 (e.g., the value of Y determines the drive strength of output stage 316). For example, in embodiments where Y is equal to 4, selectably using 1, 2 or 4 of transistors 310(1)-310(Y) and 312(1)-312(Y) corresponds to a 1x, 2x, or 4x relative drive strength. The absolute drive strength is based on the technology of the CMOS transistors. For example, in a 40 nm CMOS IC, typical drive strengths for 1x, 2x and 4x drives might be equal to the library inverter cells INVX1, INVX2, INVX4, respectively.

The programmable drive strength of delay cell 300 is determined by setting the parallel transistor connections of 1, 2 or Y transistors by selectively modifying the metal-1 interconnect layout to either connect or disconnect given ones of the parallel transistors from the output signal Vout. As shown in FIG. 6a, output stage 316 is set for maximum drive strength since all transistors 310(1)-310(Y) and 312(1)-312(Y) are connected in parallel to output signal Vout. As shown in FIG. 6b, output stage 316 is set for minimum drive strength since only transistors 310(1) and 312(1) are connected to output signal Vout, while transistors 310(2)-310(Y) and 312(2)-312(Y) are disconnected from output signal Vout. For example, transistors 310(2)-310(Y) are disconnected from output signal Vout by having their drain nodes rerouted to connect to Vdd, and transistors 312(2)-312(Y) are disconnected from output signal Vout by having their drain nodes coupled to Vss. Since, in a given IC design, every occurrence of delay cell 300 has the same values of Y, and thus the same physical size, every occurrence of delay cell 300 in the IC design is identical in physical size and terminal location, regardless of its drive strength value.

Thus, as described herein, delay cell 300 can be programmed to have varying drive strength based on the needs of an IC designer by varying the metal-1 layout of the delay cell, but without changing the physical size or terminal locations of the delay cell found in the cell library. Thus, if it is determined that a delay cell should have a stronger drive strength, for example if additional circuit elements are coupled to the delay cell output, the IC designer does not need to select a different delay cell from the standard cell library, but rather edits the metal-1 layout of the delay cell to add or remove drain connections of transistors 310(2)-310(Y) and 312(2)-312(Y) of output stage 316. Thus, the current place and route results are not disturbed because there is no size difference between delay cells of different drive strengths.

Figure 7A:
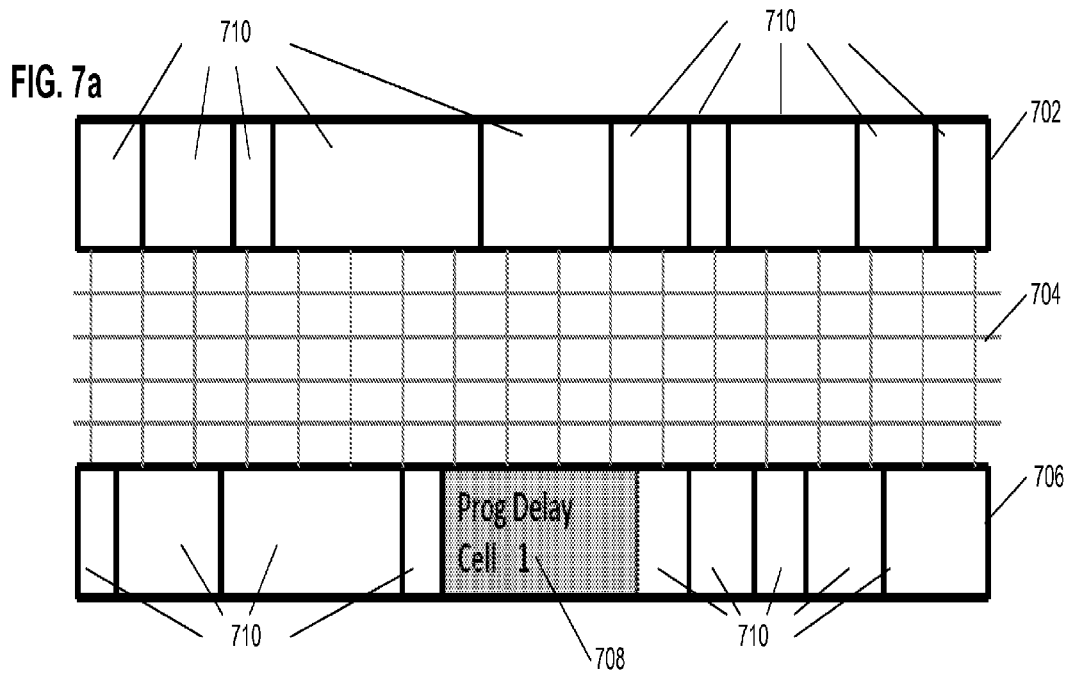
FIG. 7a and FIG. 7b show block diagrams of exemplary IC layouts employing the delay cell of FIG. 3 in accordance with exemplary embodiments.
Figure 7B:
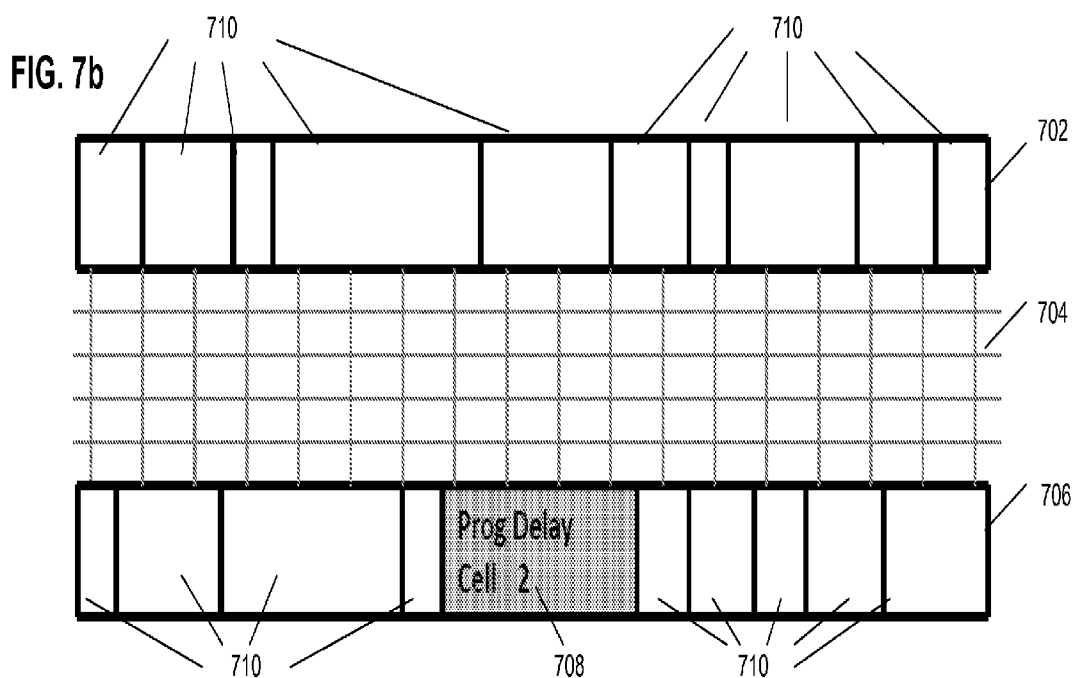

FIGS. 7a and 7b show an exemplary IC design layout. As shown in FIG. 7a, an IC design might comprise one or more cell rows, shown as cell rows 702 and 706, where the cell rows are interconnected by cell interconnect grid 704. Each cell row might allow an IC designer to place one or more circuit elements from the cell library, shown generally as cells 710. Routing of signals between cells can be set by cell interconnect grid 704. Standard place and route procedures involve the optimized, compact abutment of all cells in the circuit and the necessary multi-metal layer connectivity of the associated signal wires. As shown in FIG. 7a, the IC designer has first placed programmable delay cell 1, which occupies cell area 708, and which has a given delay value. If, in the course of timing closure, the IC designer determines that a different delay value is required to meet timing requirements of the IC, the designer might modify the metal-1 layout of programmable delay cell 1 to have a desired delay value. As shown in FIG. 7b, programmable delay cell 1 has its metal-1 layout modified to become programmable delay cell 2, having a larger delay value than programmable delay cell 1. However, programmable delay cell 2 occupies the same cell area, 708 as programmable delay cell 1, despite having a larger delay value than programmable delay cell 1. By occupying the same cell area, no changes are required to the layout of one or more surrounding cells 710, or to signal routing in cell interconnect grid 704, thereby significantly reducing the effort involved in circuit timing verification and modification. Similarly, changing the drive strength of delay cell 708 also has no impact on occupied cell area and, thus, no changes are required to the layout of one or more surrounding cells 710, or to signal routing in cell interconnect grid 704 to change the drive strength.

Although delay cells with balanced rise/fall times are typically desired, circuit timing situations might occur where an imbalance in rise/fall times is desired, for example to achieve proper setup and hold times. Using metal-1 programmability of delay cell 300 as described herein, delay cell 300 might be configured to have asymmetric P/N stack connections in the internal inverting delay stages to generate rise/fall delay skew. As described herein, implementing alternating internal stages of delay inverters by the metal-1 programmability of delay cell 300 might allow delay cell 300 to have faster or slower rise or fall, either balanced or skewed, as needed to meet circuit timing requirements.

As shown in FIGS. 4-5 and 8-9, delay cell 300 might be implemented as a non-inverting delay cell, if there are an even number of delay stages (e.g., M is an even number, combined with input inverter 314 and output inverter 316). In some non-inverting embodiments of delay cell 300, the number of delay stages, M, might be equal to 4, and the number of stacked P transistors 302 in each stage and stacked N transistors 304 in each stage, N, might also be equal to 4, although other numbers for N and M might be employed, and N and M are not necessarily equal. For example, employing 4 delay stages (e.g., M=4), each delay stage with 4 stacked P transistors 302 and 4 stacked N transistors 304 (e.g., N=4), desirably achieves a wide range of rise/fall delay skew tuning. Delay cell 300 might also be implemented as an inverting delay cell, for example if there are an odd number of delay stages (e.g., M is an odd number, combined with input inverter 314 and output inverter 316). In some inverting embodiments of delay cell 300, the number of delay stages, M, might be equal to 5, and the number of stacked P transistors 302 in each stage and stacked N transistors 304 in each stage, N, might be equal to 4, although other numbers for N and M might be employed. For example, employing 5 delay stages (e.g., M=5), each delay stage with 4 stacked P transistors 302 and 4 stacked N transistors 304 (e.g., N=4), desirably achieves a wide range of rise/fall delay skew tuning.

Figure 8:
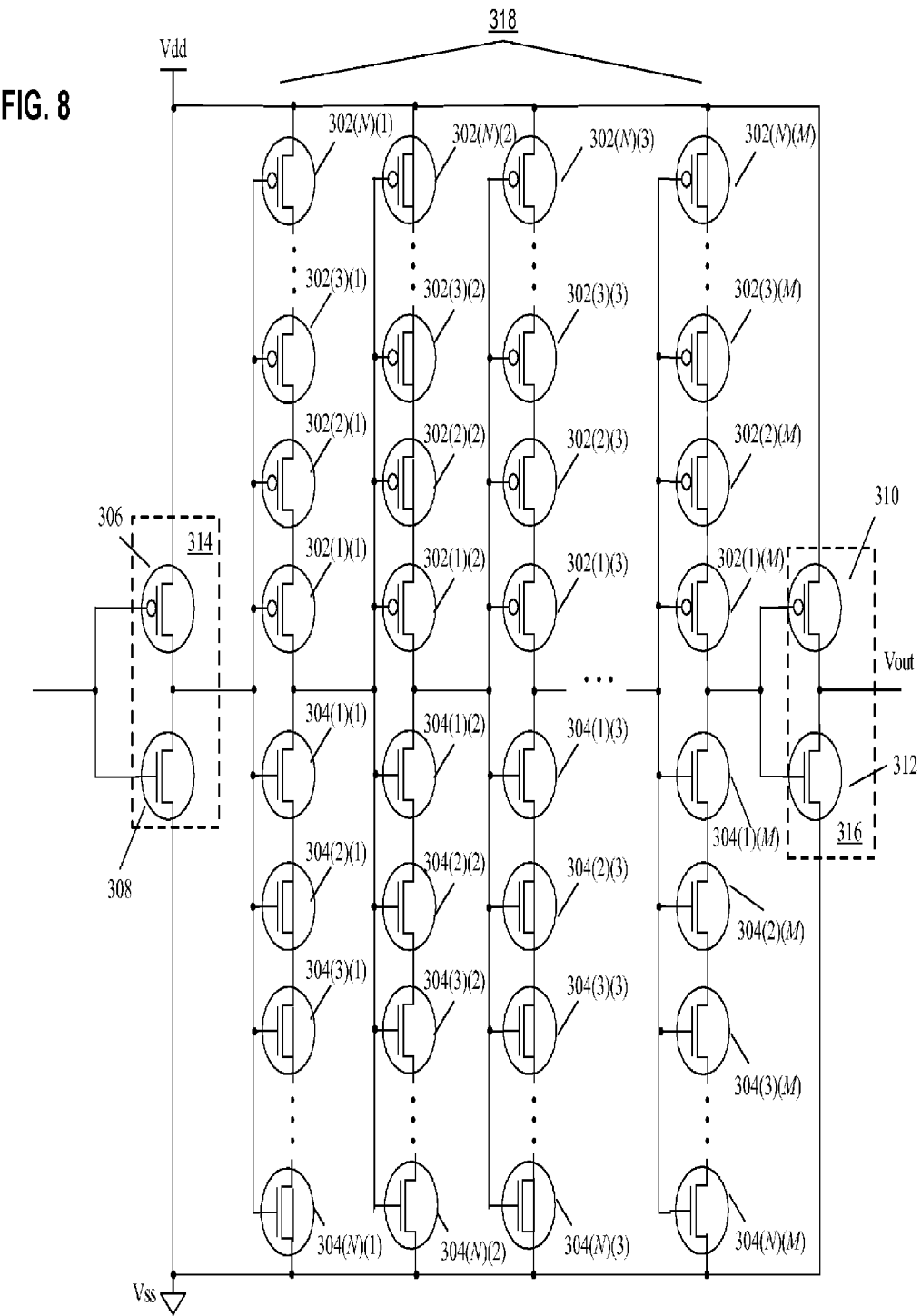
FIG. 8 shows a schematic diagram of the delay cell of FIG. 3, implemented for a larger rise time skew in accordance with exemplary embodiments.

FIG. 8 shows an exemplary schematic for delay cell 300 programmed to have a larger rise time than fall time. As shown in FIG. 8, delay cell 300 is programmed to have a larger rise time than fall time due to an alternating path to modify rise and fall delay times in corresponding delay stages of delay cell 300. For example, if delay cell 300 is non-inverting (e.g., M is an even number), a rising edge input signal arriving at input inverter 314 will have a corresponding, delayed, rising edge output signal provided as Vout by output inverter 316. Thus, as shown in FIG. 8, modifying the metal-1 mask of delay cell 300 provides increased rise time by creating an alternating path corresponding to how a rising edge output signal propagates from input to output of delay cell 300.

For example, when delay cell 300 is non-inverting, a rising edge input signal to the delay cell corresponds to a rising edge output signal, and the rising edge input signal is inverted by input inverter 314. Thus, the rising edge input signal corresponds to a falling edge signal provided to a first delay stage of delay cell 300 (e.g., the delay stage comprising stacked P transistors $302(n)(1)$ and stacked N transistors $304(n)(1)$). Thus, to increase the rise time of an output signal of non-inverting delay cell 300, the rise time in the first delay stage should be made longer than the fall time. This is accomplished, as shown in FIG. 8, by including a larger number of the stacked P transistors 302 than stacked N transistors 304 in the first delay stage. As shown in FIG. 8, all of stacked P transistors 302 are included in the pull up signal path of the first delay stage, while all but one of stacked N transistors 304 are removed from the pull down signal path of the first delay stage (e.g., by modification of the metal-1 layer of the IC design to modify the configurable connection between the source and drain regions of transistors 302 and 304, as described herein).

The first delay stage provides a rising edge signal to the second delay stage (e.g., the delay stage comprising stacked P transistors $302(n)(2)$ and stacked N transistors $304(n)(2)$). Thus, to increase the rise time of an output signal of non-inverting delay cell 300, the fall time in the second delay stage should be made longer than the rise time. This is accomplished, as shown in FIG. 8, by including a larger number of the stacked N transistors 304 than stacked P transistors 302 in the second delay stage. As shown in FIG. 8, all of stacked N transistors 304 are included in the pull down signal path of the second delay stage, while all but one of stacked P transistors 302 are removed from the pull up signal path of the second delay stage. The second delay stage provides a falling edge signal to the third delay stage, and so on, until output inverter 316 is provided a corresponding falling edge signal. Thus, an alternating path of delay stages having increased rise times or increased fall times is implemented to intentionally provide a skewed output signal having a maximum increased rise time.

Although described in regard to a non-inverting implementation of delay cell 300, the output signal skew might be similarly adjusted for inverting implementations of delay cell 300. For example, when delay cell 300 is inverting (e.g., M is an odd number), a falling edge input signal to the delay cell corresponds to a rising edge output signal, and the falling edge input signal is inverted by input inverter 314. Thus, the falling edge input signal corresponds to a rising edge signal provided to a first delay stage of delay cell 300 (e.g., the delay stage comprising stacked P transistors $302(n)(11)$ and stacked N transistors $304(n)(1)$). Thus, to increase the rise time of an output signal of inverting delay cell 300, the fall time in the first delay stage should be made longer than the rise time by including a larger number of the stacked N transistors 304 than stacked P transistors 302 in the first delay stage. The first delay stage provides a falling edge signal to the second delay stage (e.g., the delay stage comprising stacked P transistors $302(n)(2)$ and stacked N transistors 304 $(n)(2)$). Thus, to increase the rise time of an output signal of inverting delay cell 300, the rise time in the second delay stage should be made longer than the fall time by including a larger number of the stacked P transistors 302 than stacked N transistors 304 in the second delay stage. The second delay stage provides a rising edge signal to the third delay stage, and so on, until output inverter 316 is provided a corresponding falling edge signal. Thus, an alternating path of delay stages having increased rise times or increased fall times is implemented to intentionally provide a skewed output signal having a maximum increased rise time.

As shown in the exemplary embodiment of FIG. 8, the rise time of the output signal of delay cell 300 is increased to a maximum possible value by modifying all corresponding stacked transistors in every delay stage in the alternating signal propagation path of delay cell 300. However, tuning of the rise time skew might be achieved, for example, by modifying fewer than all of the delay stages in the alternating signal propagation path of delay cell 300, by modifying fewer than all corresponding stacked transistors in one or more of the delay stages in the alternating signal propagation path of delay cell 300, or by a combination thereof. As described herein, in some embodiments, the number of stacked P transistors 302 in each stage and stacked N transistors 304 in each stage of delay cell 300, N, might be equal to 4, which desirably allows for tuning of rise/fall delay skew as desired for circuit timing constraints.

Figure 9:
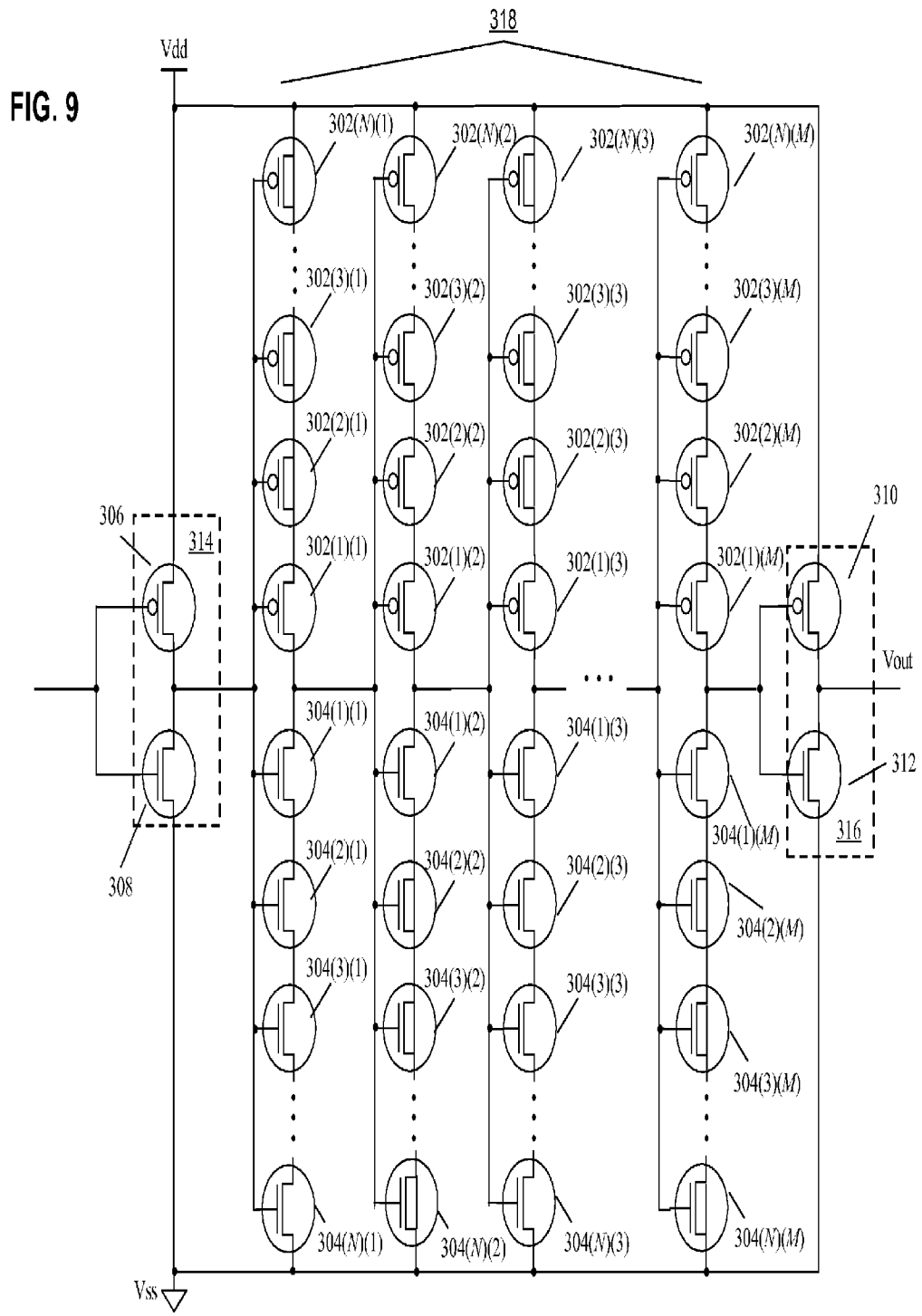
FIG. 9 shows a schematic diagram of the delay cell of FIG. 3, implemented for a larger fall time skew in accordance with exemplary embodiments.

FIG. 9 shows an exemplary schematic for delay cell 300 programmed to have a larger fall time than rise time. Similarly as described with regard to FIG. 8, delay cell 300 might be programmed to have a larger fall time than rise time due to an alternating path to modify rise and fall delay times in corresponding delay stages of delay cell 300. For example, if delay cell 300 is non-inverting (e.g., M is an even number), a falling edge input signal arriving at input inverter 314 will have a corresponding, delayed, falling edge output signal provided as Vout by output inverter 316. Thus, as shown in FIG. 9, modifying the metal-1 mask of delay cell 300 provides increased fall time by creating an alternating path corresponding to how a falling edge output signal propagates from input to output of delay cell 300.

For example, when delay cell 300 is non-inverting, a falling edge input signal to the delay cell corresponds to a falling edge output signal, and the falling edge input signal is inverted by input inverter 314. Thus, the falling edge input signal corresponds to a rising edge signal provided to a first delay stage of delay cell 300 (e.g., the delay stage comprising stacked P transistors 302(n)(1) and stacked N transistors 304(n)(1)). Thus, to increase the fall time of an output signal of non-inverting delay cell 300, the fall time in the first delay stage should be made longer than the fall time, as shown in FIG. 9, by including a larger number of the stacked N transistors 304 than stacked P transistors 302 in the first delay stage. As shown in FIG. 9, all of stacked N transistors 304 are included in the pull down signal path of the first delay stage, while all but one of stacked P transistors 302 are removed from the pull up signal path of the first delay stage (e.g., by modification of the metal-1 layer of the IC design to modify the configurable connection between the source and drain regions of transistors 302 and 304, as described herein).

The first delay stage provides a falling edge signal to the second delay stage (e.g., the delay stage comprising stacked P transistors 302(n)(2) and stacked N transistors 304(n)(2)). Thus, to increase the fall time of an output signal of non-inverting delay cell 300, the rise time in the second delay stage should be made longer than the fall time. This is accomplished, as shown in FIG. 9, by including a larger number of the stacked P transistors 302 than stacked N transistors 304 in the second delay stage. As shown in FIG. 9, all of stacked P transistors 302 are included in the pull up signal path of the second delay stage, while all but one of stacked N transistors 304 are removed from the pull down signal path of the second delay stage. The second delay stage provides a rising edge signal to the third delay stage, and so on, until output inverter 316 is provided a corresponding rising edge signal. Thus, an alternating path of delay stages having increased rise times or increased fall times is implemented to intentionally provide a skewed output signal having a maximum increased fall time.

Although described in regard to a non-inverting implementation of delay cell 300, it can be seen that the output signal skew can be similarly adjusted for inverting implementations of delay cell 300. For example, when delay cell 300 is inverting, a rising edge input signal to the delay cell corresponds to a falling edge output signal, and the rising edge input signal is inverted by input inverter 314. Thus, the rising edge input signal corresponds to a falling edge signal provided to a first delay stage of delay cell 300 (e.g., the delay stage comprising stacked P transistors 302(n)(1) and stacked N transistors 304(n)(1)). Thus, to increase the fall time of an output signal of inverting delay cell 300, the fall time in the first delay stage should be made longer than the rise time by including a larger number of the stacked N transistors 304 than stacked P transistors 302 in the first delay stage. The first delay stage provides a falling edge signal to the second delay stage (e.g., the delay stage comprising stacked P transistors 302(n)(2) and stacked N transistors 304(n)(2)). Thus, to increase the fall time of an output signal of inverting delay cell 300, the rise time in the second delay stage should be made longer than the fall time by including a larger number of the stacked P transistors 302 than stacked N transistors 304 in the second delay stage. The second delay stage provides a rising edge signal to the third delay stage, and so on, until output inverter 316 is provided a corresponding rising edge signal. Thus, an alternating path of delay stages having increased rise times or increased fall times is implemented to intentionally provide a skewed output signal having a maximum increased rise time.

As shown in the exemplary embodiment of FIG. 9, the fall time of the output signal of delay cell 300 is increased to a maximum possible value by modifying all corresponding stacked transistors in every delay stage in the alternating signal propagation path of delay cell 300. However, tuning of the fall time skew might be achieved, for example, by modifying fewer than all of the delay stages in the alternating signal propagation path of delay cell 300, by modifying fewer than all corresponding stacked transistors in one or more of the delay stages in the alternating signal propagation path of delay cell 300, or by a combination thereof. As described herein, in some embodiments, the number of stacked P transistors 302 in each stage and stacked N transistors 304 in each stage of delay cell 300, N, might be equal to 4, which desirably allows for tuning of rise/fall delay skew as desired for circuit timing constraints.

Figure 10:
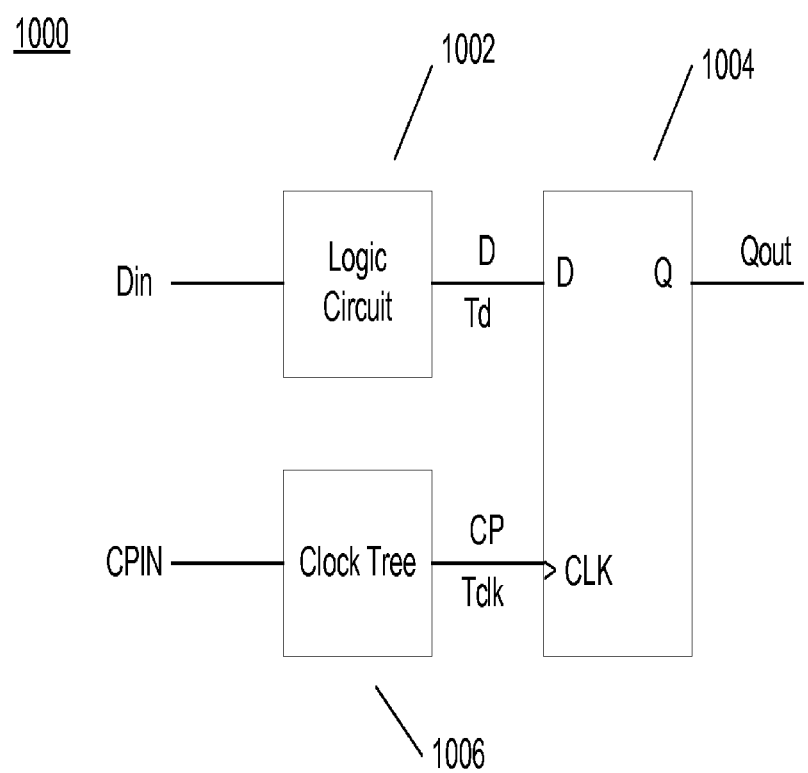
FIG. 10 shows a block diagram of an exemplary logic circuit.
Figure 11:
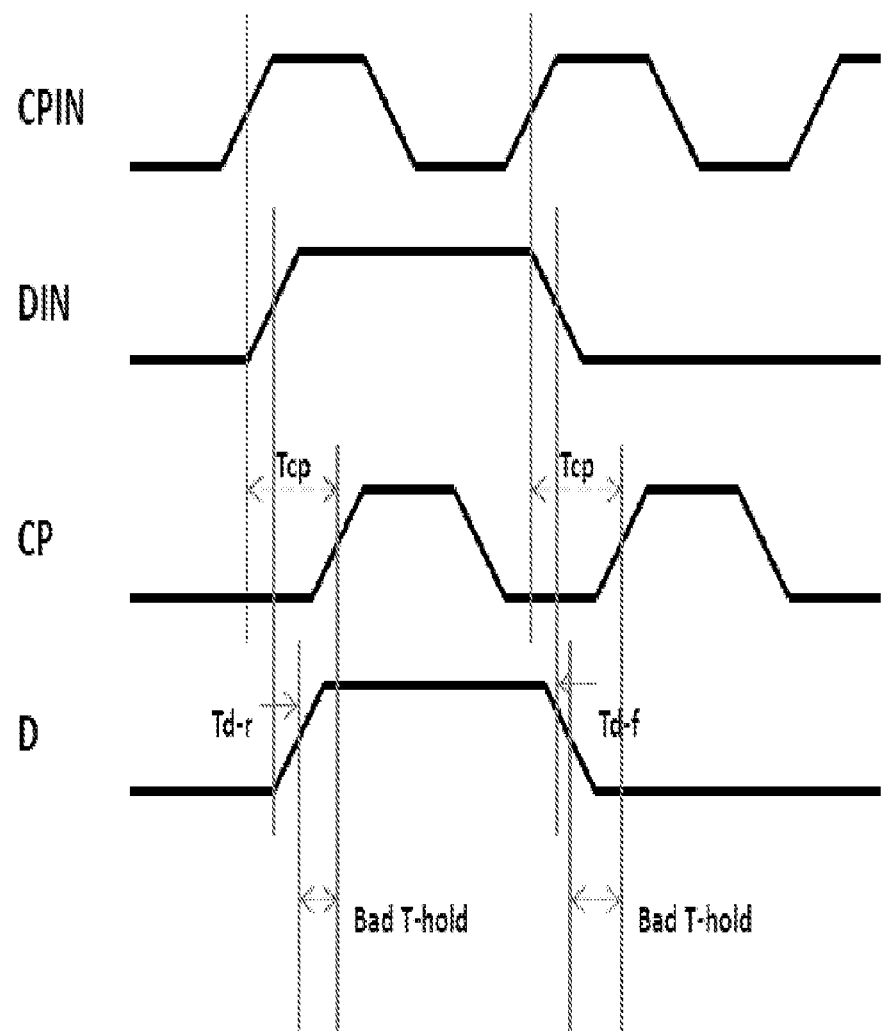
FIG. 11 shows an exemplary timing diagram of the logic circuit of FIG. 10.

FIG. 10 shows an exemplary system 1000 employing a logic circuit 1002, a clock tree 1006, and a latch 1004. Logic circuit 1002 receives input signal Din, and provides output signal D to latch 1004. Clock tree 1006 receives a clock input signal, CPIN, and provides a clock output signal, CP, to latch 1004. Exemplary signal waveforms for Din, D, CPIN, and CP are shown in FIG. 11. As shown in FIG. 11, a clock delay (Tcp) of clock output signal CP might be greater than a data delay (Td) of the data output signal, D. In such a case, hold time violations (T-hold) might occur for both rising and falling edges of D at latch 1004. As shown in the exemplary case of FIG. 11, a rise time data delay (Td-r) might be greater than a fall time data delay (Td-f). To correct the timing issue, data signal D might be delayed by including one or more delay cells 300 in the data signal path, such as shown in FIG. 12.

Figure 12:
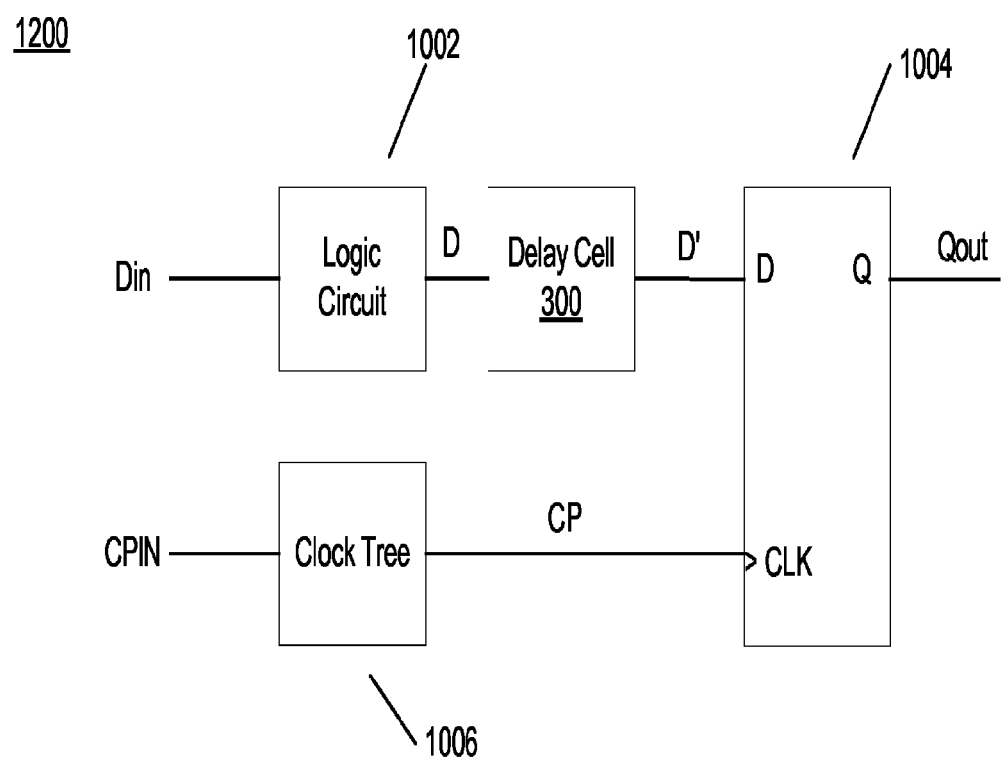
FIG. 12 shows a block diagram of an exemplary logic circuit employing the delay cell of FIG. 3 in a data path of the circuit.

FIG. 12 shows an exemplary system of FIG. 10 modified to include delay cell 300 in the data signal path. As shown in FIG. 12, exemplary system 1200 employs logic circuit 1002, clock tree 1006, and latch 1004, but also includes delay cell 300 in the data signal path. Logic circuit 1002 receives input signal Din, and provides output signal D to delay cell 300, which, in turn, provides delayed output signal D' to latch 1004. Clock tree 1006 receives a clock input signal, CPIN, and provides a clock output signal, CP, to latch 1004. As described in regard to FIG. 11, the exemplary circuit of FIG.

Figure 13:
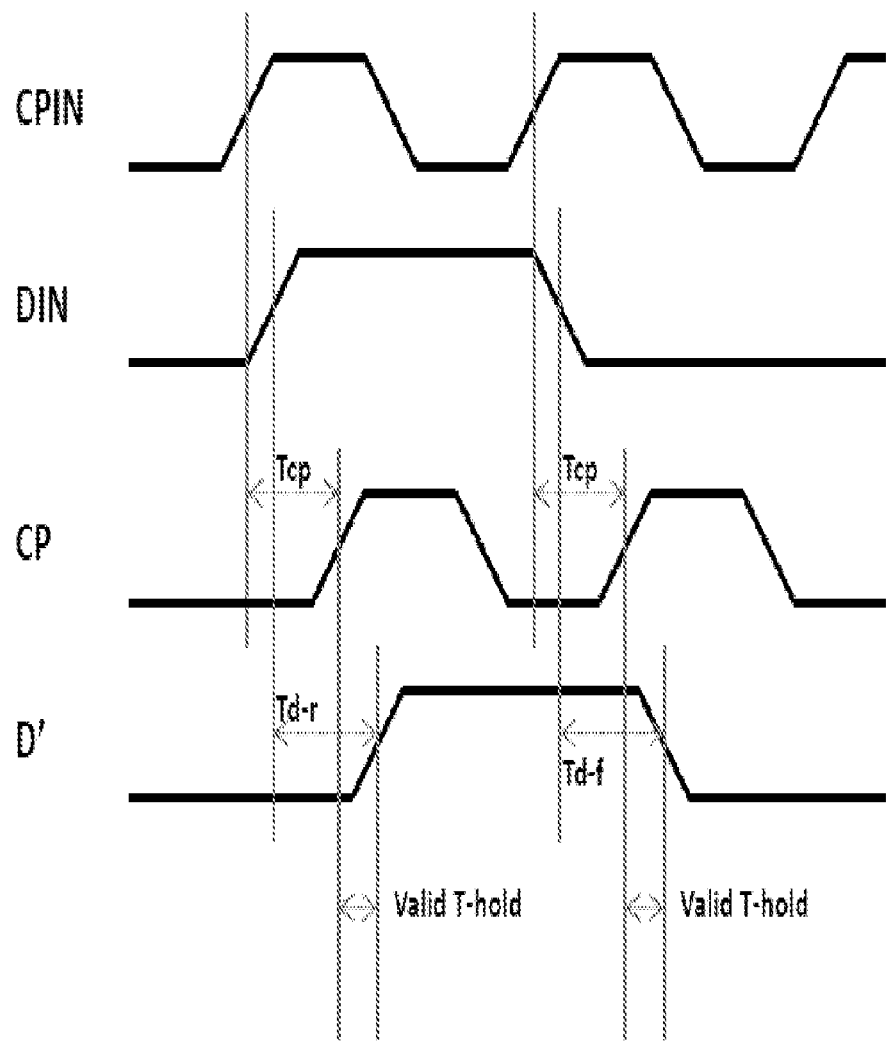
FIG. 13 shows an exemplary timing diagram of the logic circuit of FIG. 12.

10 had a rise time data delay (Td-r) that was greater than a fall time data delay (Td-f). Thus, delay cell 300 might desirably be configured to have greater fall delay than rising delay. FIG. 13 shows exemplary signal waveforms for Din, D'CPIN, and CP having a balanced T-hold signal D'. The use of delay cell 300 prevents unwanted extra delay that a delay cell having balanced rise and fall delays would provide, which might cause T-setup timing problems for latch 1004.

Figure 14:
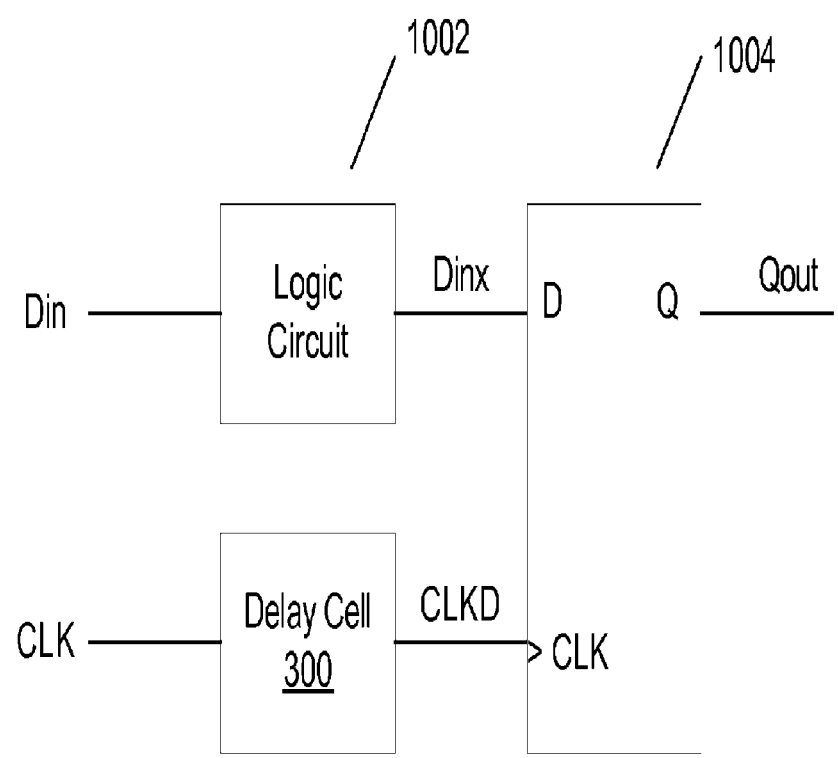
FIG. 14 shows a block diagram of an exemplary logic circuit employing the delay cell of FIG. 3 in a clock signal path of the circuit.

Delay cell 300 might be employed to solve timing issues by varying the delay of one or both of data signals and clock signals. FIG. 14 shows exemplary circuit 1400 that includes delay cell 300 in the clock signal path (CLK) to ensure sufficient setup time (Tsu) for the data signal (Dinx) at latch 1004. As shown in FIG. 14, logic circuit 1002 receives an input signal Din and generates an output signal Dinx. Signal Dinx is provided to latch 1004. Clock signal CLK is provided to delay cell 300, which then provides delayed clock signal CLKD to latch 1004. During timing closure analysis of the IC design, timing verification, including the delay value required for delay cell 300, are determined through simulations using the best known characterized worst-case slow (WCS) and worst-case fast (WCF) timing information for all cells in the IC design, where the timing information is based on a standard timing library for the cells.

Figure 15:
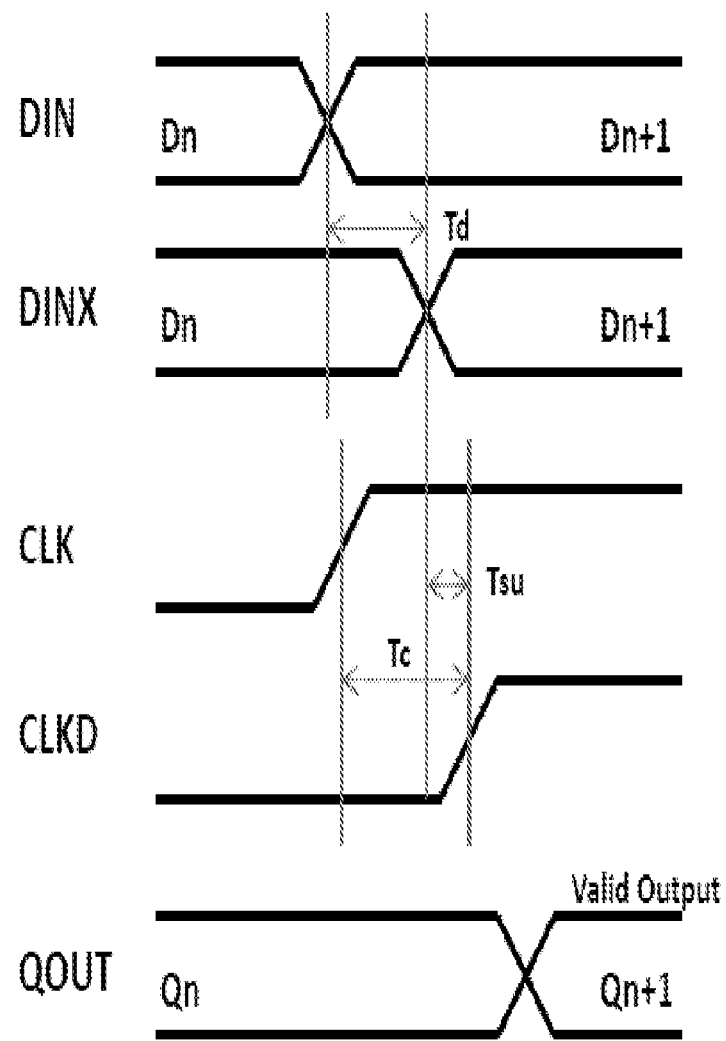
FIG. 15 shows an exemplary timing diagram of the logic circuit of FIG. 14.

FIG. 15 shows an exemplary timing diagram of the expected timing of the circuit shown in FIG. 9 using timing library information. As shown in FIG. 15, data signal Dinx is delayed through logic circuit 1002 block by time Td. To achieve proper data setup time (Tsu), a delay is desired on the CLK signal. Thus, delay cell 300 is inserted to generate clock delay time Tc on signal CLKD, where Tc is approximately equal to Td plus Tsu, for circuit 1400 to operate as desired under both WCS and WCF conditions.

FIG. 16 illustrates the circuit timing failure that can occur when initial design silicon is produced using a Poly-gate CD variation (+/−5%) to simulate WCS and WCF manufacturing variation. Poly-gate CD variations on the elements in logic circuit 1002 create timing delay variations on signal Dinx. Typically, a 2.5 times WCS to WCF delay variation might be seen through the logic circuit 1002. However, for a delay cell employing long channel length transistors, the Poly CD variation would create little or no WCS to WCF delay variation. For example, a +/−5% variation of 40 nm is 2 nm, and a +/−2 nm variation on a 140 nm channel length transistor would provide a negligible delay variation. This could lead to a significant timing skew difference between Dinx and CLKD versus the circuit simulation timing. This timing skew could lead to IC failure, such as shown in FIG. 16, where the delayed clock signal CLKD does not allow sufficient setup time Tsu for latch 1004 to output correct data. However, if the delay cell is implemented as programmable skew delay cell 300, which employs minimum channel length transistors, the Poly CD variation would also produce a 2.5×WCS to WCF delay variation in the CLK signal delay, thus maintaining Dinx and CLKD timing skew and maintaining a valid Tsu for correct operation of circuit 1400, such as shown in the exemplary timing diagram of FIG. 15.

Figure 17:
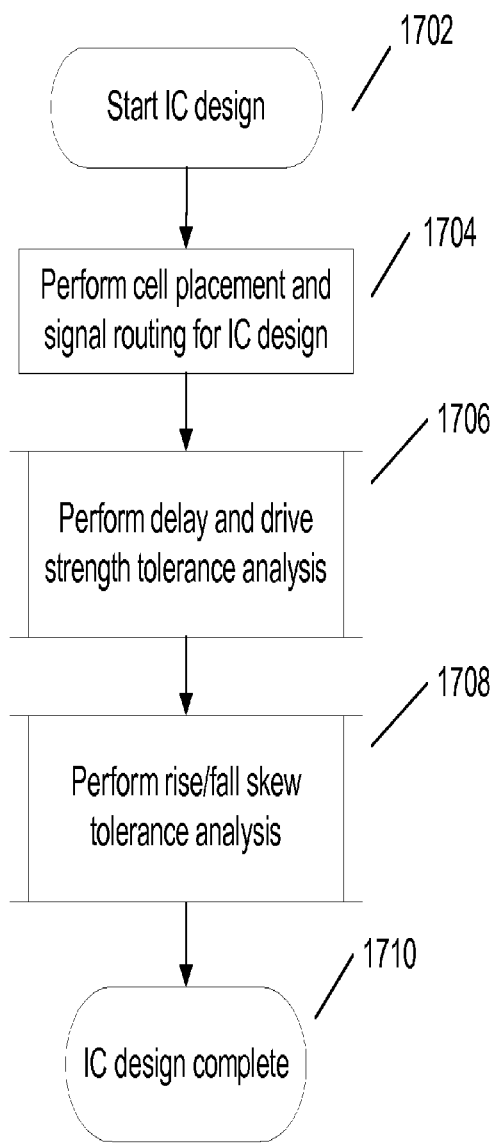
FIG. 17 shows an exemplary flow diagram for an IC design process in accordance with exemplary embodiments.
Figure 18:
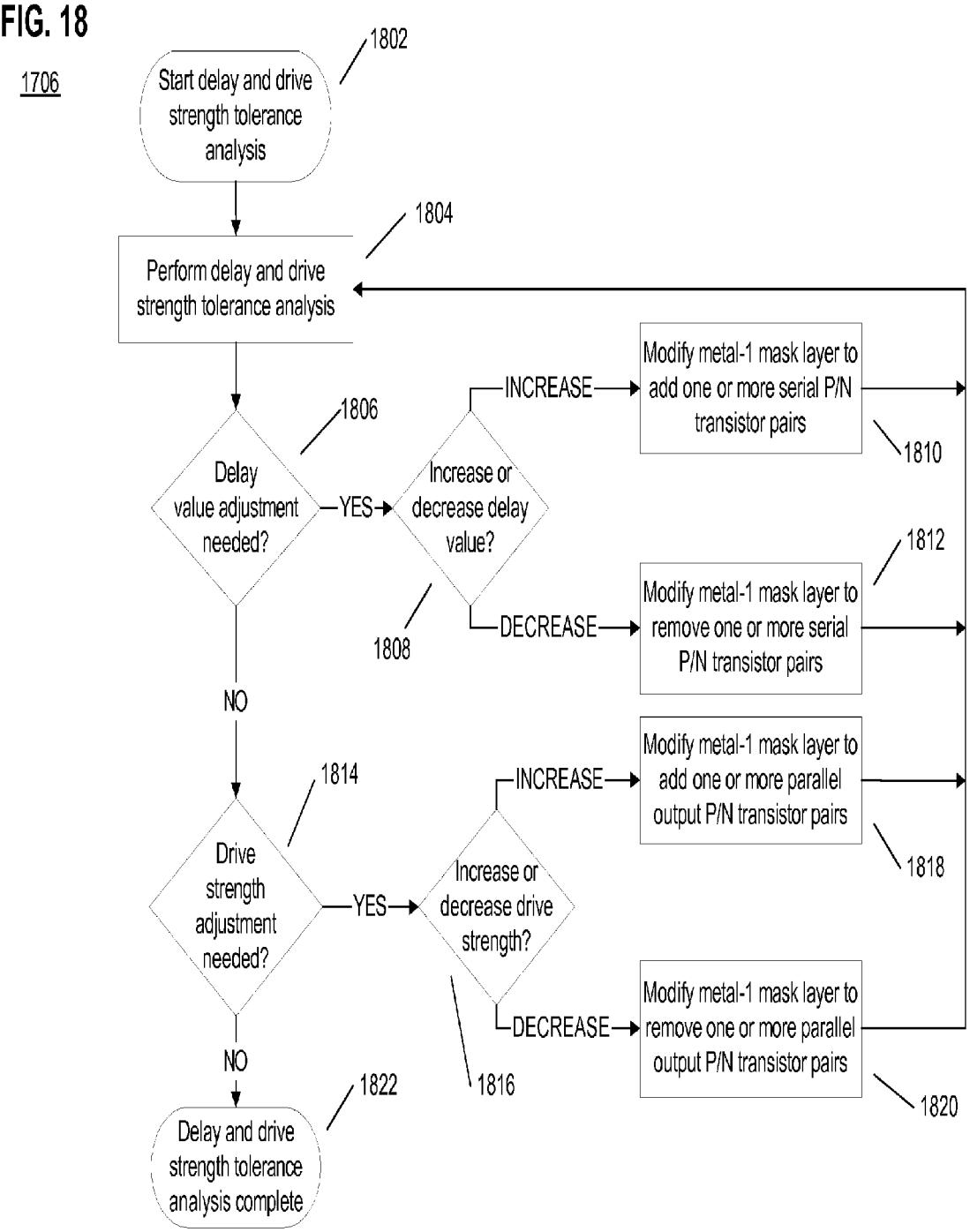
FIG. 18 shows an exemplary flow diagram for modifying the delay value and drive strength of the delay cell of FIG. 3, in accordance with exemplary embodiments.

FIG. 17 shows a flow diagram of exemplary IC design process 1700. At step 1702, IC design process 1700 is started by an IC designer. At step 1704, the IC designer performs cell placement of circuit elements from a design library, and routes signals from cell to cell. Such cell placements and signal routings might be done manually, automatically or a combination of both. At step 1706, the IC designer performs delay time and drive strength tolerance analysis, for example, based on delay tolerances in a timing library. Additional detail of step 1706 is shown in FIG. 18. At step 1708, the IC designer performs rise/fall time skew tolerance analysis, which might also be based on delay tolerances in a timing library. Additional detail of step 1708 is shown in FIG. 19. At step 1710, the IC designer completes the IC design.

FIG. 18 shows additional detail of step 1706. At step 1802, the IC designer starts subprocess 1706, and at step 1804 performs the delay and drive strength tolerance analysis. Based on the analysis of step 1804, at step 1806 a test determines whether the delay value of one or more delay cells 300 require adjustment to meet timing requirements for the IC design. If, at step 1806 the delay value of one or more delay cells 300 should be adjusted, at step 1808, it is determined whether the delay value of a given delay cell 300 should be increased or decreased. If, at step 1808 the delay value of a given delay cell 300 should be increased, at step 1810 the IC designer modifies the metal-1 mask layer of the delay cell to add one or more additional pairs of PMOS and NMOS transistors to each inverter stage of delay stage 318. For example, as described herein, the IC designer might remove the configurable drain-to-source connections of one or more of PMOS transistors 302(2)-302(N) and NMOS transistors 304(2)-304(N) to increase the delay value. If, at step 1808 the delay value of a given delay cell 300 should be decreased, at step 1812 the IC designer modifies the metal-1 mask layer of the delay cell to remove one or more pairs of PMOS and NMOS transistors from each inverter stage of delay stage 318. For example, as described herein, the IC designer might add the configurable drain-to-source connections of one or more of PMOS transistors 302(2)-302(N) and NMOS transistors 304(2)-304(N) to decrease the delay value.

After the delay values of one or more delay cells 300 are modified at steps 1810 and 1812, process 1706 might return to step 1804 to re-perform a timing analysis of the IC design with the new delay values. Notably, it is not necessary to re-perform the cell placement and signal routing of step 1704 since delay cell 300 is a uniform size and footprint regardless of its delay value. Once, at step 1806, no adjustment to delay values are needed, process 1706 proceeds to step 1814.

If, at step 1814 the drive strength of one or more delay cells 300 should be adjusted, at step 1816, it is determined whether the drive strength of a given delay cell 300 should be increased or decreased. If, at step 1816 the drive strength of a given delay cell 300 should be increased, at step 1818 the IC designer modifies the metal-1 mask layer of the delay cell to add one or more additional pairs of parallel PMOS and NMOS transistors to output stage 316 of each delay cell 300. For example, as described herein, the IC designer might move the configurable drain-to-source connections of one or more of PMOS transistors 310(2)-310(Y) and NMOS transistors 312(2)-312(Y) to increase the drive strength, for example by connecting one or more of PMOS transistors 310(2)-310(Y) and NMOS transistors 312(2)-312(Y) to output signal Vout (FIG. 10a). If, at step 1816 the drive strength of a given delay cell 300 should be decreased, at step 1820 the IC designer modifies the metal-1 mask layer of the delay cell to move the configurable drain-to-source connections of one or more of PMOS transistors 310(2)-310(Y) and NMOS transistors 312(2)-312(Y) to decrease the drive strength, for example by disconnecting one or more of PMOS transistors 310(2)-310(Y) and NMOS transistors 312(2)-312(Y) from output signal Vout.

After the drive strength of one or more delay cells 300 are modified at steps 1818 and 1820, process 1706 might return to step 1804 to re-perform a timing analysis of the IC design with the new drive strength values. Notably, it is not necessary to re-perform the cell placement and signal routing of step 1704 since delay cell 300 is a uniform size and footprint regardless of its drive strength.

FIG. 19 shows additional detail of step 1708. At step 1902, the IC designer starts the rise/fall time skew analysis, and at step 1904, performs the rise/fall time skew analysis. Based on the analysis of step 1904, at step 1906 it is determined whether the rise time or fall time of one or more delay cells 300 require unbalanced adjustment to meet timing requirements for the IC design. If, at step 1906 the rise time or fall time of one or more delay cells 300 needs unbalanced adjustment, at step 1908, it is determined whether the rise time or fall time of a given delay cell 300 should be adjusted. If, at step 1908, the rise time of a given delay cell 300 should be adjusted, at step 1910, it is determined whether the rise time of the given delay cell 300 should be increased or decreased. If, at step 1910 the rise time of a given delay cell 300 should be increased, at step 1912 the IC designer modifies the metal-1 mask layer of one or more series transistors in corresponding alternating stacks of P transistors and stacks of N transistors in one or more of the delay stages of delay cell 300. For example, as described in regard to FIGS. 8 and 9, the IC designer might modify the configurable drain-to-source connections of one or more of PMOS transistors 302(2)-302(N) and NMOS transistors 304(2)-304(N) in one or more of the M delay stages to increase the rise time delay of the output signal (Vout) of delay cell 300, in an unbalanced way (e.g., the rise time is not delayed the same amount as the fall time). If, at step 1910 the rise time of a given delay cell 300 should be decreased, at step 1914 the IC designer modifies the metal-1 mask layer of one or more series transistors in corresponding alternating stacks of P transistors and stacks of N transistors in one or more of the delay stages of delay cell 300. For example, as described in regard to FIGS. 8 and 9, the IC designer might modify the configurable drain-to-source connections of one or more of PMOS transistors 302(2)-302(N) and NMOS transistors 304(2)-304(N) in one or more of the M delay stages to decrease the rise time delay of the output signal (Vout) of delay cell 300, in an unbalanced way (e.g., the rise time is not delayed the same amount as the fall time).

If, at step 1908, the fall time of a given delay cell 300 should be adjusted, at step 1916, it is determined whether the fall time of the given delay cell 300 should be increased or decreased. If, at step 1916 the fall time of a given delay cell 300 should be increased, at step 1918 the IC designer modifies the metal-1 mask layer of one or more series transistors in corresponding alternating stacks of P transistors and stacks of N transistors in one or more of the delay stages of delay cell 300. For example, as described in regard to FIGS. 8 and 9, the IC designer might modify the configurable drain-to-source connections of one or more of PMOS transistors 302(2)-302(N) and NMOS transistors 304(2)-304(N) in one or more of the M delay stages to increase the fall time delay of the output signal (Vout) of delay cell 300, in an unbalanced way (e.g., the rise time is not delayed the same amount as the fall time). If, at step 1916 the fall time of a given delay cell 300 should be decreased, at step 1920 the IC designer modifies the metal-1 mask layer of one or more series transistors in corresponding alternating stacks of P transistors and stacks of N transistors in one or more of the delay stages of delay cell 300. For example, as described in regard to FIGS. 8 and 9, the IC designer might modify the configurable drain-to-source connections of one or more of PMOS transistors 302(2)-302(N) and NMOS transistors 304(2)-304(N) in one or more of the M delay stages to decrease the fall time delay of the output signal (Vout) of delay cell 300, in an unbalanced way (e.g., the rise time is not delayed the same amount as the fall time).

After the rise times or fall times of one or more delay cells 300 are modified at steps 1912, 1914, 1918, 1920, or 1922 process 1708 might return to step 1904 to re-perform a timing analysis of the IC design with the new delay values. Notably, it is not necessary to re-perform the cell placement and signal routing of step 1704 since delay cell 300 is a uniform size and footprint regardless of its delay value. Once, at step 1906, no unbalanced adjustment to rise times or fall times are needed, process 1708 proceeds to step 1922. At step 1922, it might be determined if a balanced adjustment of rise times and fall times are needed for any of delay cells 300. If any balanced rise times and fall times need to be adjusted, at step 1924 process 1708 returns to step 1816 of FIG. 18 to adjust the drive strength of the corresponding delay cells 300, which provides a balanced adjustment of the rise and fall times of the delay cell. If, at step 1922, no balanced rise and fall time adjustment is needed for any of delay cells 300, process 1708 completes at step 1926.

Thus, as described herein, embodiments of the present invention provide programmable-skew delay cells that are configurable for (i) a range of delay values, (ii) multiple output drive strength capabilities, and (iii) a range of rise and fall times, both balanced and unbalanced, without changing the physical size or terminal layout of the programmable-skew delay cell. By maintaining a single layout footprint regardless of delay value, drive strength, or rise/fall times and balance, described embodiments provide non-disruptive delay cell interchange during the iterative circuit place & route and circuit timing verification design procedures. If timing delay adjustments associated with circuit paths using these programmable-skew delay cells are required, no changes to the existing circuit interconnect wires and the associated parasitic RC wiring values are required, thus, not altering any existing, verified circuit timing. Total footprint compatibility is also achieved through the use of metal-2 signal pin connections in the identical location regardless of delay values. Further, by employing minimum channel length transistors, the programmable delay cells prevent WCS to WCF delay variation larger than other standard cells in the IC design. This aids in circuit timing closure when verifying proper data path setup and hold timing across the extreme process, voltage and temperature (PVT) requirements for the circuit design, preventing data signal or clock signal delay skews that could create signal setup and hold violations under some PVT conditions.

With minor metal-1 mask layer changes to the IC design, programmable skew delay cell 300 might be adjusted to any delay value, for example any one of the twelve standard delay cell values commonly found in design libraries, without a disruption in circuit cell placement, or routing connections. Further, intentional rise/fall skew might be generated, again with only minor metal-1 mask layer changes to the IC design, without a disruption in circuit cell placement or routing connections. No other manufacturing layer changes are required. This flexibility of delay cell 300 is valuable in the situation where circuit data path or clock path delays are found to need a timing adjustment after initial silicon wafer manufacture has been evaluated. Without this flexibility of delay cell 300, a delay cell change would require an engineer design change involving repeating place and route and timing closure efforts, as well as generating new silicon manufacture masks—a time consuming and expensive engineering change. As described herein, with embodiments of the described programmable delay cells, a delay cell change is possible with only a timing verification and reissue of the IC design metal-1 mask layer.

While the exemplary embodiments have been described with respect to processes of circuits, including possible implementation as a single integrated circuit, a multi-chip module, a single card, or a multi-card circuit pack, the present invention is not so limited.

As would be apparent to one skilled in the art, various functions of circuit elements might also be implemented as processing blocks in a software program. Such software might be employed in, for example, a digital signal processor, microcontroller, or general-purpose computer. Such software might be embodied in the form of program code embodied in tangible media, such as magnetic recording media, optical recording media, solid state memory, floppy diskettes, CD-ROMs, hard drives, or any other non-transitory machine-readable storage medium, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps might be included in such methods, and certain steps might be omitted or combined, in methods consistent with various embodiments.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

Unless explicitly stated otherwise, each numerical value and range should be interpreted as being approximate as if the word "about" or "approximately" preceded the value of the value or range. Signals and corresponding nodes or ports might be referred to by the same name and are interchangeable for purposes here.

Transistors are typically shown as single devices for illustrative purposes. However, it is understood by those skilled in the art that transistors will have various sizes (e.g., gate width and length) and characteristics (e.g., threshold voltage, gain, etc.) and might consist of multiple transistors coupled in parallel to get desired electrical characteristics from the combination. Further, the illustrated transistors might be composite transistors.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports might be referred to by the same name and are interchangeable for purposes here.

It will be further understood that various changes in the details, materials, and arrangements of the parts which have been described and illustrated in order to explain the nature of this invention might be made by those skilled in the art without departing from the scope of the invention as expressed in the following claims.

We claim:

1. A delay cell for a complementary metal oxide semiconductor (CMOS) integrated circuit (IC), the delay cell comprising:
   a delay stage configured to generate a delayed output signal based on a provided input signal, the delayed output signal having a programmable delay through the delay cell, the delay cell having at least one of (i) a selectable delay value from a plurality of delay values and (ii) a selectable skew value of a rise time and fall time of an output signal of the delay cell, wherein the delay cell has a relatively uniform cell size and terminal layout over a range of the plurality of delay values and the range of skew values;
   wherein the at least one of the selectable delay value and the selectable skew value are selected by modifying a single layer of a layout of the IC, without modifying the cell size and terminal layout of the delay stage, thereby achieving a delay cell having a substantially uniform cell size and terminal layout over the range of the plurality of delay values and the range of skew values.

2. The delay cell of claim 1, wherein the single layer of the layout of the IC is a metal-1 layer of the layout of the IC.

3. The delay cell of claim 1, wherein the selectable skew value is selected by configuring a drive strength for the output signal from the delay stage.

4. The delay cell of claim 3, wherein the selectable drive strength of the output signal is configured to adjust a rise time and a fall time of the output signal of the delay cell uniformly, thereby providing balanced skew adjustment of the delay cell.

5. The delay cell of claim 3, wherein the selectable drive strength of the output signal is configured to adjust a rise time and a fall time of the output signal of the delay cell independently, thereby providing unbalanced skew adjustment of the delay cell.

6. The delay cell of claim 1, wherein the selectable delay value is selected by configuring a number of delay stages of the delay cell that are connected in series.

7. The delay cell of claim 6, wherein the selectable skew value is adjusted by configuring a number of transistors of one or more of the delay stages of the delay cell.

8. The delay cell of claim 1, wherein the delay cell is configured to be one of an inverting delay cell and a non-inverting delay cell.

9. The delay cell of claim 1, wherein the delay cell comprises:
   an input inverter stage comprising a PMOS and NMOS transistor pair, the input inverter stage configured to transfer an input signal of the delay cell to the delay stage;
   an output inverter stage configured to generate a selectable drive strength for the output signal from the delay stage, thereby to provide an output signal of the delay cell as a delayed version of the input signal of the delay cell;
   wherein the delay stage comprises:
      M series-coupled inverter stages driven between first and second voltage potentials, M a positive integer, each series-coupled inverter stage comprising N transistor pairs of stacked PMOS transistors and stacked NMOS transistors, N a positive integer, a gate node of each of the stacked PMOS transistors and the stacked NMOS transistors coupled to an input of the inverter stage, wherein the N transistor pairs comprise configurable source-drain node connections between a drain node and a source node of each transistor in the pair, wherein the selectable delay value corresponds to a configuration of coupled and de-coupled source-drain node connections to adjust a delay value of each of the M inverter stages, wherein:

when the configurable source-drain node connection is placed between the source node and the drain node of each transistor in one of the N transistor pairs of one of the M inverter stages, the delay value of the inverter stage is reduced, and when the configurable source-drain node connection is removed from between the source node and the drain node of each transistor in one of the N transistor pairs of one of the M inverter stages, the delay value of the inverter stage is increased.

10. The delay cell of claim 9, wherein:
when the configurable source-drain node connection is modified between the source node and the drain node of corresponding one or more transistors in a corresponding one of (i) stacked PMOS transistors and (ii) stacked NMOS transistors of one or more of the M inverter stages, the output skew value of the delay cell is adjusted.

11. The delay cell of claim 10, wherein:
to increase an output rise time of the delay cell:
the configurable source-drain node connection is removed from one or more of (i) stacked PMOS transistors and (ii) stacked NMOS transistors of one or more of the M inverter stages correspond to a rising-edge output of the delay cell; and
the configurable source-drain node connection is placed for one or more of (i) stacked PMOS transistors and (ii) stacked NMOS transistors of one or more of the M inverter stages correspond to a falling-edge output of the delay cell;

to increase an output fall time of the delay cell:
the configurable source-drain node connection is placed for one or more of (i) stacked PMOS transistors and (ii) stacked NMOS transistors of one or more of the M inverter stages correspond to a rising-edge output of the delay cell; and
the configurable source-drain node connection is removed from one or more of (i) stacked PMOS transistors and (ii) stacked NMOS transistors of one or more of the M inverter stages correspond to a falling-edge output of the delay cell.

12. A method of configuring a programmable delay cell in a complementary metal oxide semiconductor (CMOS) integrated circuit (IC), the method comprising:
determining, in a timing tolerance analysis of the IC, whether one or more programmable delay cells require a modification to at least one of (i) a delay value of the programmable delay cell and (ii) an output skew value of the programmable delay cell;
if one or more programmable delay cells require a modified output skew value:
changing a drive strength for the output signal from the delay cell;
if one or more programmable delay cells require a modified delay value:
changing a number of delay stages of the delay cell that are connected in series,
wherein the at least one of the selectable delay value and the selectable skew value are selected by modifying a single layer of a layout of the IC, without modifying the cell size and terminal layout of the delay stage, thereby achieving a delay cell having a substantially uniform cell size and terminal layout over the range of the plurality of delay values and the range of skew values.

13. The method of claim 12, wherein the single layer of the layout of the IC is a metal-1 layer of the layout of the IC.

14. The method of claim 12, wherein changing the selectable drive strength of the output signal comprises adjusting a rise time and a fall time of the output signal of the delay cell uniformly, thereby providing balanced skew adjustment of the delay cell.

15. The method of claim 12, wherein changing the selectable drive strength of the output signal comprises adjusting a rise time and a fall time of the output signal of the delay cell independently, thereby providing unbalanced skew adjustment of the delay cell.

16. The method of claim 12, wherein selecting the selectable skew value further comprises configuring a number of transistors of one or more of the delay stages of the delay cell.

17. The method of claim 12, further comprising:
generating an IC design layout comprising cell placement and signal routing;
performing a polysilicon gate critical dimension variation on the IC design layout; and
performing a timing analysis of the IC design layout.

18. The method of claim 17, further comprising:
if one or more programmable delay cells require an increased delay value:
removing a configurable connection of one or more transistor pairs of one or more inverter stages of the programmable delay cell, wherein the configurable connection is a connection between a drain node and a source node of each transistor in the one or more transistor pairs, wherein the removing the configurable connections comprises modifying a metal-1 layer of the IC design layout;
if one or more programmable delay cells require a decreased delay value:
adding a configurable connection of one or more transistor pairs of one or more inverter stages of the programmable delay cell, wherein the configurable connection is a connection between a drain node and a source node of each transistor in the one or more transistor pairs, wherein the adding the configurable connections comprises modifying a metal-1 layer of the IC design layout; and
maintaining a relatively uniform cell size and a relatively uniform terminal layout for all delay values of the programmable delay cell.

19. The method of claim 17, further comprising:
if one or more programmable delay cells require a modified output skew value:
determining whether one or more of a rise time and a fall time of an output signal of the delay cell should be modified;
if the rise time of the output signal should be modified:
changing one or more configurable connections in a metal-1 layout of the IC for each of the one or more programmable delay cells, so as to modify a rise time of each of the one or more programmable delay cells;
if the fall time of the output signal should be modified:
changing one or more configurable connections in a metal-1 layout of the IC for each of the one or more programmable delay cells, so as to modify a fall time of each of the one or more programmable delay cells; and maintaining, by each programmable delay cell, a relatively uniform cell size and a relatively uniform terminal layout for all output skew values.

* * * * *